US011743869B2

(12) United States Patent
Yu et al.

(10) Patent No.: US 11,743,869 B2
(45) Date of Patent: Aug. 29, 2023

(54) RESOURCE ALLOCATION METHOD, FIRST NODE, AND SECOND NODE

(71) Applicant: Huawei Technologies Co., Ltd., Shenzhen (CN)

(72) Inventors: Zheng Yu, Beijing (CN); Yongqiang Fei, Shenzhen (CN); Xingqing Cheng, Beijing (CN); Fang Nan, Shenzhen (CN); Chao Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 390 days.

(21) Appl. No.: 17/151,495

(22) Filed: Jan. 18, 2021

(65) Prior Publication Data
US 2021/0212028 A1 Jul. 8, 2021

Related U.S. Application Data

(63) Continuation of application No. 16/521,242, filed on Jul. 24, 2019, now Pat. No. 10,897,750, which is a
(Continued)

(51) Int. Cl.
*H04W 72/04* (2023.01)
*H04W 72/23* (2023.01)
*H04L 5/00* (2006.01)

(52) U.S. Cl.
CPC .......... *H04W 72/04* (2013.01); *H04L 5/0046* (2013.01); *H04L 5/0094* (2013.01); *H04W 72/23* (2023.01)

(58) Field of Classification Search
CPC .... H04W 72/04; H04W 72/23; H04L 5/0046; H04L 5/0094
See application file for complete search history.

(56) References Cited

U.S. PATENT DOCUMENTS 9,398,589 B2 7/2016 Xu et al.
9,622,230 B2 4/2017 Chen et al.
(Continued)

FOREIGN PATENT DOCUMENTS

CN 101651906 A 2/2010
CN 102067694 A 5/2011
(Continued)

OTHER PUBLICATIONS

Zte, "Resource allocation for Rel-13 low complexity UEs", 3GPP TSG RAN WG1 Meeting #82, R1-154043, Beijing, China, Aug. 24-28, 2015, 4 pages.
(Continued)

*Primary Examiner* — Raj Jain
(74) *Attorney, Agent, or Firm* — Slater Matsil, LLP

(57) ABSTRACT

Embodiments of the present invention disclose a resource allocation method, a first node, and a second node. The method includes the following steps: A first node receives downlink control information (DCI) from a second node, where the DCI includes resource indication information, and the resource indication information is used to indicate a transmission resource allocation manner; the first node determines a first resource allocation manner based on the resource indication information, where the first resource allocation manner is used to allocate a transmission resource greater than one narrowband; the first node determines an allocated transmission resource based on the first resource allocation manner and the resource indication information; and the first node transmits data by using the allocated transmission resource.

22 Claims, 14 Drawing Sheets

Related U.S. Application Data continuation of application No. PCT/CN2017/072692, filed on Jan. 25, 2017.

(56) References Cited

U.S. PATENT DOCUMENTS

| | | | |
|---|---|---|---|
| 10,433,311 | B2 | 10/2019 | Zeng et al. |
| 10,897,750 | B2* | 1/2021 | Yu .................. H04W 72/04 |
| 11,057,899 | B2* | 7/2021 | Yang ................ H04W 4/70 |
| 2011/0085513 | A1 | 4/2011 | Chen et al. |
| 2011/0150108 | A1* | 6/2011 | Chae ............... H04L 5/0067 |
| | | | 375/259 |
| 2013/0322363 | A1 | 12/2013 | Chen et al. |
| 2015/0009939 | A1 | 1/2015 | Zhang et al. |
| 2016/0037538 | A1 | 2/2016 | Li et al. |
| 2016/0218758 | A1* | 7/2016 | Smaini ............. H04B 1/1018 |
| 2016/0242207 | A1 | 8/2016 | Yasukawa et al. |
| 2017/0367074 | A1 | 12/2017 | Zhang et al. |
| 2019/0036640 | A1 | 1/2019 | Xu et al. |
| 2019/0182827 | A1* | 6/2019 | Wang ............... H04W 72/20 |
| 2020/0195370 | A1 | 6/2020 | Li et al. |
| 2021/0195567 | A1* | 6/2021 | Yi ................... H04L 5/0055 |
| 2021/0212028 | A1* | 7/2021 | Yu ................... H04L 5/0094 |
| 2022/0264543 | A1* | 8/2022 | Fang ................ H04W 4/70 |

FOREIGN PATENT DOCUMENTS

| | | |
|---|---|---|
| CN | 103327615 A | 9/2013 |
| CN | 103548407 A | 1/2014 |
| CN | 104053241 A | 9/2014 |
| CN | 104380820 A | 2/2015 |
| CN | 106211334 A | 12/2016 |
| EP | 2503835 A1 | 9/2012 |
| JP | 2012195954 A | 10/2012 |
| JP | 2014512114 A | 5/2014 |
| KR | 20120090082 A | 8/2012 |
| KR | 20140027115 A | 3/2014 |
| KR | 20150013722 A | 2/2015 |

OTHER PUBLICATIONS

Lenovo, et al., "Resource Allocation and DCI design for FeMTC", 3GPP TSG RAN WG1 Meeting #88, R1-1702660, Athens, Greece, Feb. 13-18, 2017, 5 pages.

3rd Generation Partnership Project; Technical Specification Group Radio Access Network; Evolved Universal Terrestrial Radio Access (E-UTRA); Multiplexing and channel coding (Release 14), 3GPP TS 36.212 V14.1.1 (Jan. 2017), 149 pages.

3rd Generation Partnership Project; Technical Specification Group Radio Access Network; Evolved Universal Terrestrial Radio Access (E-UTRA); Physical layer procedures (Release 10), 3GPP TS 36.213 V10.1.0 (Mar. 2011).

3rd Generation Partnership Project; Technical Specification Group Radio Access Network; Evolved Universal Terrestrial Radio Access (E-UTRA); Physical layer procedures (Release 14), 3GPP TS 36.213 V14.1.0 (Dec. 2016), 414 pages.

Ericsson, "Resource allocation and DCI definition for FeMTC," 3GPP TSG-RAN WG1 meeting #87, R1-1611100, Reno, NV, USA, Nov. 14-18, 2016, 7 pages.

Huawei, et al., "DCI design on supporting larger bandwidth in FeMTC," 3GPP TSG RAN WG1 Meeting #86bis, R1-1608624, Lisbon, Portugal, Oct. 10-14, 2016, 3 pages.

Huawei et al., "On enabling and disabling of feMTC sub features," 3GPP TSG RAN WG1 Meeting #87, R1-1611181, Reno, NV, USA, Nov. 14-18, 2016, 3 pages.

Huawei et al., "DCI design for supporting wider bandwidth in FeMTC," 3GPP TSG RAN WG1 Meeting #87, R1-1611183, Reno, NV, USA, Nov. 14-18, 2016, 5 pages.

Qualcomm Inc., "Impact of Reduction of Maximum Bandwidth on MTC," 3GPP TSG-RAN WG1 #68, R1-120563, Dresden, Germany, Feb. 6-10, 2012, 3 pages.

* cited by examiner

RESOURCE ALLOCATION METHOD, FIRST NODE, AND SECOND NODE

CROSS-REFERENCE TO RELATED APPLICATIONS

This application is a continuation of U.S. patent application Ser. No. 16/521,242, filed on Jul. 24, 2019, now U.S. Pat. No. 10,897,750, which is a continuation of International Application No. PCT/CN2017/072692, filed on Jan. 25, 2017, All of the afore-mentioned patent applications are hereby incorporated by reference in their entireties.

TECHNICAL FIELD

This application relates to the field of communications technologies, and in particular, to a resource allocation method, a first node, and a second node.

BACKGROUND

In a Long Term Evolution (LTE) system, a base station needs to allocate a resource to user equipment (UE), for example, a physical uplink shared channel (PUSCH) resource or a physical downlink shared channel (PDSCH) resource. The UE sends data or receives data based on the resource allocated by the base station. An existing resource allocation method includes: allocating, by a base station, a resource to UE in a full system bandwidth by using downlink control information (DCI). A resource allocation field in the DCI may indicate information about the resource allocated to the UE.

With continuous development of the Internet of Things and intelligent terminals, a bandwidth that can be indicated by a terminal continuously changes. Specifically, when a bandwidth supported by a terminal is relatively small, a resource allocated by the base station to the terminal can only be in a narrowband (NB) whose bandwidth is less than the system bandwidth. For example, the narrowband includes six resource blocks (RB). When a bandwidth supported by a terminal is relatively large, an uplink or downlink data channel bandwidth of a bandwidth-reduced low-complexity (BL) terminal may be extended to 5 MHz (which is corresponding to four NBs); and for a non-BL terminal, an uplink data channel bandwidth may be extended to 5 MHz, and a downlink data channel bandwidth may even reach the system bandwidth, that is, 20 MHz (16 NBs). In an existing technical solution, when a base station allocates a resource to a terminal, the base station can only allocate a specific NB in a system bandwidth and an RB in a narrowband. Consequently, a quantity of RBs allocated to the terminal is limited.

SUMMARY

Embodiments of the present invention provide a resource allocation method, a first node, and a second node, so as to allocate a transmission resource greater than one NB in a first resource allocation manner, and increase a quantity of RBs allocated to the first node.

According to a first aspect, an embodiment of the present invention provides a resource allocation method, including: receiving, by a first node, downlink control information (DCI) from a second node, where the DCI includes resource indication information, and the resource indication information is used to indicate a transmission resource allocation manner; determining a first resource allocation manner based on the resource indication information, where the first resource allocation manner is used to allocate a transmission resource greater than one narrowband (NB); determining an allocated transmission resource based on the first resource allocation manner and the resource indication information; and transmitting data by using the allocated transmission resource.

In the first aspect, the transmission resource greater than one NB can be allocated in the first resource allocation manner, and a quantity of RBs allocated to the first node is increased.

In an optional embodiment, the determining, by the first node, a first resource allocation manner based on the resource indication information includes: when a value of the first field belongs to a first state set, determining, by the first node, the first resource allocation manner.

Further, optionally, a quantity of binary bits of the first field is 5; and the first state set includes a 5-bit binary value corresponding to a positive integer within an interval range [21, 31].

Further, optionally, a system bandwidth of the second node includes a plurality of resource block groups (RBGs), and each RBG includes at least one RB; and the determining, by the first node, an allocated transmission resource based on the first resource allocation manner and the resource indication information is specifically: when the resource indication information includes the first field, and the resource indication information further includes a fourth field, determining, by the first node, a resource indicator value based on the first field and the fourth field; and searching for one or more target RBGs corresponding to the resource indicator value.

Further, optionally, the determining, by the first node, a resource indicator value based on the first field and the fourth field is specifically: calculating, by the first node, a first intermediate indicator value based on the first field and the fourth field by using a first calculation formula; and determining, based on a preset first mapping relationship, a resource indicator value corresponding to the first intermediate indicator value, where the first calculation formula is $X_1 = 11 \ast M_1 + (N_1 - 21)$, where $M_1$ represents a decimal number corresponding to a binary value of the fourth field, $N_1$ represents a decimal number corresponding to a binary value of the first field, and $X_1$ represents the first intermediate indicator value.

Further, optionally, the system bandwidth of the second node includes 96 RBs, a maximum bandwidth supported by the first node is 96 RBs, each RBG includes six RBs, and the first mapping relationship is $RIV = X_1 + 16$, where RIV represents the resource indicator value.

Further, optionally, the system bandwidth of the second node includes 96 RBs, a maximum bandwidth supported by the first node is 24 RBs, each RBG includes three RBs, and the first mapping relationship is:

$$i_1 = \left\lfloor \frac{X_1}{55} \right\rfloor$$

$$j_1 = \left\lfloor \frac{X_1 - 55 \ast i_1}{30 - i} \right\rfloor \ast (5 - 2 \ast i_1) + i_1$$

$$RIV = X_1 - \left\lfloor \frac{X_1 - 55 \ast i_1}{30 - i} \right\rfloor \ast (30 - i_1) - 55 \ast i_1 + 32 \ast (2 + j_1), \text{ where}$$

$i_1$ represents a parameter calculated based on the first intermediate indicator value $X_1$, $j_1$ represents a parameter calculated based on the first intermediate indicator value $X_1$, and RIV represents the resource indicator value; or RIV=$X_1$+Offset($X_1$), where RIV represents the resource indicator value, and Offset ($X_1$) represents a predefined offset of the resource indicator value RIV relative to the first intermediate indicator value $X_1$.

In an optional embodiment, the resource indication information includes a second field including Z binary bits, and Z is a positive integer; and the determining, by the first node, a first resource allocation manner based on the resource indication information is specifically: when each bit in the Z bits of the second field is 1, determining, by the first node, the first resource allocation manner.

Further, optionally, a quantity of binary bits of the second field is 2.

Further, optionally, a system bandwidth of the second node includes a plurality of resource block groups (RBGs), and each RBG includes at least one RB; and the determining, by the first node, an allocated transmission resource based on the first resource allocation manner and the resource indication information is specifically: when the resource indication information includes the second field including the Z bits, and the resource indication information further includes a sixth field, determining, by the first node, a resource indicator value based on the sixth field, and searching for one or more target RBGs corresponding to the resource indicator value.

Further, optionally, the sixth field includes a third sub-field and a fourth sub-field, and the determining, by the first node, a resource indicator value based on the sixth field is specifically: calculating, by the first node, a third intermediate indicator value based on the third sub-field and the fourth sub-field by using a third calculation formula; and determining, based on a preset third mapping relationship, a resource indicator value corresponding to the third intermediate indicator value, where the third calculation formula is $X_3=8*M_3+N_3$, where $M_3$ represents a decimal number corresponding to a binary value of the third sub-field, $N_3$ represents a decimal number corresponding to a binary value of the fourth sub-field, and $X_3$ represents the third intermediate indicator value.

Further, optionally, the system bandwidth of the second node includes 96 RBs, a maximum bandwidth supported by the first node is 96 RBs, each RBG includes six RBs, and the third mapping relationship is RIV=$X_3$+16, where RIV represents the resource indicator value.

Further, optionally, the system bandwidth of the second node includes 96 RBs, a maximum bandwidth supported by the first node is 24 RBs, each RBG includes three RBs, and the third mapping relationship is:

$$i_3 = \left\lfloor \frac{X_3}{28} \right\rfloor$$

$$j_3 = \left\lfloor \frac{X_3 - 28*i_3}{15 - \left\lfloor \frac{i}{2} \right\rfloor} \right\rfloor * (5 - 2*i_3) + i_3$$

$$RIV = 2*\left(X_3 - \left\lfloor \frac{X_3 - 28*i_3}{15 - \left\lfloor \frac{i_3}{2} \right\rfloor} \right\rfloor * \left(15 - \left\lfloor \frac{1}{2} \right\rfloor\right) - 28*i_3\right) + 32*(2 + j_3), \text{ where}$$

$i_3$ represents a parameter calculated based on the third intermediate indicator value $X_3$, $j_3$ represents a parameter calculated based on the third intermediate indicator value $X_3$, and RIV represents the resource indicator value; or RIV=$X_3$+Offset($X_3$), where RIV represents the resource indicator value, and Offset ($X_3$) represents a predefined offset of the resource indicator value RIV relative to the third intermediate indicator value $X_3$.

In an optional embodiment, the resource indication information includes a third field; and the determining, by the first node, a first resource allocation manner based on the resource indication information is specifically: when the third field is a first preset value, determining, by the first node, the first resource allocation manner.

Further, optionally, a quantity of binary bits of the third field is 1.

Further, optionally, a system bandwidth of the second node includes a plurality of resource block groups (RBGs), and each RBG includes at least one RB; and the determining, by the first node, an allocated transmission resource based on the first resource allocation manner and the resource indication information is specifically: when the resource indication information includes the third field, and the resource indication information further includes a fifth field, determining, by the first node, a resource indicator value based on the fifth field, and searching for one or more target RBGs corresponding to the resource indicator value.

Further, optionally, the fifth field includes a first sub-field and a second sub-field, and the determining, by the first node, a resource indicator value based on the fifth field is specifically: calculating, by the first node, a second intermediate indicator value based on the first sub-field and the second sub-field by using a second calculation formula; and determining, based on a preset second mapping relationship, a resource indicator value corresponding to the second intermediate indicator value, where the second calculation formula is $X_2=32*M_2+N_2$, where $M_2$ represents a decimal number corresponding to a binary value of the first sub-field, $N_2$ represents a decimal number corresponding to a binary value of the second sub-field, and $X_2$ represents the second intermediate indicator value.

Further, optionally, the system bandwidth of the second node includes 96 RBs, a maximum bandwidth supported by the first node is 96 RBs, each RBG includes three RBs, and the second mapping relationship is RIV=$X_2$+63, where RIV represents the resource indicator value.

Further, optionally, the system bandwidth of the second node includes 96 RBs, a maximum bandwidth supported by the first node is 24 RBs, each RBG includes two RBs, and the second mapping relationship is:

$$i_2 = \left\lfloor \frac{X_2}{82} \right\rfloor$$

$$j_2 = \left\lfloor \frac{X_2 - 82*i_2}{45 - i} \right\rfloor * (S - 2*i_2) + i_2$$

$$RIV = X_2 - \left\lfloor \frac{X_2 - 82*i_2}{45 - i_2} \right\rfloor * (45 - i_2) - 82*i_2 + 48*(3 + j_2), \text{ where}$$

$i_2$ represents a parameter calculated based on the second intermediate indicator value $X_2$, $j_2$ represents a parameter calculated based on the second intermediate indicator value $X_2$, and RIV represents the resource indicator value; or RIV=$X_2$+Offset($X_2$), where RIV represents the resource indicator value, and Offset ($X_2$) represents a predefined offset of the resource indicator value RIV relative to the second intermediate indicator value $X_2$.

In an optional embodiment, the resource indicator value is used to indicate a start RBG and a quantity of consecutive RBGs starting from the start RBG.

According to a second aspect, an embodiment of the present invention provides a resource allocation method, including: determining, by a second node, downlink control information (DCI), where the DCI includes resource indication information, the resource indication information is used to determine a first resource allocation manner and an allocated transmission resource for a first node, and the first resource allocation manner is used to allocate a transmission resource greater than one narrowband (NB); and sending the DCI to the first node.

In the second aspect, the transmission resource greater than one NB can be allocated in the first resource allocation manner, and a quantity of RBs allocated to the first node is increased.

In an optional embodiment, the resource indication information includes a first field, and a value of the first field belongs to a first state set.

Further, optionally, a quantity of binary bits of the first field is 5; and the first state set includes a 5-bit binary value corresponding to a positive integer within an interval range [21, 31].

Further, optionally, a system bandwidth of the second node includes a plurality of resource block groups (RBGs), and each RBG includes at least one RB; and the resource indication information further includes a fourth field, and the first field and the fourth field are used to determine a resource indicator value.

Further, optionally, the first field and the fourth field are used to calculate a first intermediate indicator value according to a first calculation formula; the first intermediate indicator value is used to determine the resource indicator value based on a preset first mapping relationship; and the first calculation formula is $X_1=11+*M_1+(N_1-21)$, where $M_1$ represents a decimal number corresponding to a binary value of the fourth field, $N_1$ represents a decimal number corresponding to a binary value of the first field, and $X_1$ represents the first intermediate indicator value.

Further, optionally, the system bandwidth of the second node includes 96 RBs, a maximum bandwidth supported by the first node is 96 RBs, each RBG includes six RBs, and the first mapping relationship is $RIV=X_1+16$, where RIV represents the resource indicator value.

Further, optionally, the system bandwidth of the second node includes 96 RBs, a maximum bandwidth supported by the first node is 24 RBs, each RBG includes three RBs, and the first mapping relationship is:

$$i_1 = \left\lfloor \frac{X_1}{55} \right\rfloor$$

$$j_1 = \left\lfloor \frac{X_1 - 55 * i_1}{30 - i} \right\rfloor * (5 - 2 * i_1) + i_1$$

$$RIV = X_1 - \left\lfloor \frac{X_1 - 55 * i_1}{30 - i} \right\rfloor * (30 - i_1) - 55 * i_1 + 32 * (2 + j_1), \text{ where}$$

where $i_1$ represents a parameter calculated based on the first intermediate indicator value $X_1$, $j_1$ represents a parameter calculated based on the first intermediate indicator value $X_1$, and RIV represents the resource indicator value; or $RIV=X_1+\text{Offset}(X_1)$, where RIV represents the resource indicator value, and Offset ($X_1$) represents a predefined offset of the resource indicator value RIV relative to the first intermediate indicator value $X_1$.

In an optional embodiment, the resource indication information includes a second field including Z binary bits, Z is a positive integer, and each bit in the Z bits of the second field is 1.

Further, optionally, a quantity of binary bits of the second field is 2.

Further, optionally, a system bandwidth of the second node includes a plurality of resource block groups (RBGs), and each RBG includes at least one RB; and the resource indication information further includes a sixth field, and the sixth field is used to determine a resource indicator value.

Further, optionally, the sixth field includes a third sub-field and a fourth sub-field; the third sub-field and the fourth sub-field are used to calculate a third intermediate indicator value according to a third calculation formula; the third intermediate indicator value is used to determine the resource indicator value based on a preset third mapping relationship; and the third calculation formula is $X_3=8*M_3+N_3$, where $M_3$ represents a decimal number corresponding to a binary value of the third sub-field, $N_3$ represents a decimal number corresponding to a binary value of the fourth sub-field, and $X_3$ represents the third intermediate indicator value.

Further, optionally, the system bandwidth of the second node includes 96 RBs, a maximum bandwidth supported by the first node is 96 RBs, each RBG includes six RBs, and the third mapping relationship is:

$RIV=X_3+16$, where

RIV represents the resource indicator value.

Further, optionally, the system bandwidth of the second node includes 96 RBs, a maximum bandwidth supported by the first node is 24 RBs, each RBG includes three RBs, and the third mapping relationship is:

$$i_3 = \left\lfloor \frac{X_3}{28} \right\rfloor$$

$$j_3 = \left\lfloor \frac{X_3 - 28 * i_3}{15 - \left\lfloor \frac{i}{2} \right\rfloor} \right\rfloor * (5 - 2 * i_3) + i_3$$

$$RIV = 2 * \left( X_3 - \left\lfloor \frac{X_3 - 28 * i_3}{15 - \left\lfloor \frac{i_3}{2} \right\rfloor} \right\rfloor * \left(15 - \left\lfloor \frac{1}{2} \right\rfloor \right) - 28 * i_3 \right) + 32 * (2 + j_3), \text{ where}$$

$i_3$ represents a parameter calculated based on the third intermediate indicator value $X_3$, $j_3$ represents a parameter calculated based on the third intermediate indicator value $X_3$, and RIV represents the resource indicator value; or $RIV=X_3+\text{Offset}(X_3)$, where RIV represents the resource indicator value, and Offset ($X_3$) represents a predefined offset of the resource indicator value RIV relative to the third intermediate indicator value $X_3$.

In an optional embodiment, the resource indication information includes a third field, and the third field is a first preset value.

Further, optionally, a quantity of binary bits of the third field is 1.

Further, optionally, a system bandwidth of the second node includes a plurality of resource block groups (RBGs), and each RBG includes at least one RB; and the resource indication information further includes a fifth field, and the fifth field is used to determine a resource indicator value.

Further, optionally, the fifth field includes a first sub-field and a second sub-field; the first sub-field and the second sub-field are used to calculate a second intermediate indicator value according to a second calculation formula; the second intermediate indicator value is used to determine the resource indicator value based on a preset second mapping relationship; and the second calculation formula is:

$X_2 = 32 * M_2 + N_2$, where $M_2$ represents a decimal number corresponding to a binary value of the first sub-field, $N_2$ represents a decimal number corresponding to a binary value of the second sub-field, and $X_2$ represents the second intermediate indicator value.

Further, optionally, the system bandwidth of the second node includes 96 RBs, a maximum bandwidth supported by the first node is 96 RBs, each RBG includes three RBs, and the second mapping relationship is:

$RIV = X_2 + 63$, where

RIV represents the resource indicator value.

Further, optionally, the system bandwidth of the second node includes 96 RBs, a maximum bandwidth supported by the first node is 24 RBs, each RBG includes two RBs, and the second mapping relationship is:

$$i_2 = \left\lfloor \frac{X_2}{82} \right\rfloor$$

$$j_2 = \left\lfloor \frac{X_2 - 82 * i_2}{45 - i} \right\rfloor * (8 - 2 * i_2) + i_2$$

$$RIV = X_2 - \left\lfloor \frac{X_2 - 82 * i_2}{45 - i_2} \right\rfloor * (45 - i_2) - 82 * i_2 + 48 * (3 + j_2), \text{ where}$$

$i_2$ represents a parameter calculated based on the second intermediate indicator value $X_2$, $j_2$ represents a parameter calculated based on the second intermediate indicator value $X_2$, and RIV represents the resource indicator value; or $RIV = X_2 + \text{Offset}(X_2)$, where RIV represents the resource indicator value, and Offset($X_2$) represents a predefined offset of the resource indicator value RIV relative to the second intermediate indicator value $X_2$.

In an optional embodiment, the resource indicator value is used to indicate a start RBG and a quantity of consecutive RBGs starting from the start RBG.

According to a third aspect, an embodiment of the present invention provides a first node, including: a receiving module, configured to receive downlink control information (DCI) from a second node, where the DCI includes resource indication information, and the resource indication information is used to indicate a transmission resource allocation manner; a determining module, configured to determine a first resource allocation manner based on the resource indication information, where the first resource allocation manner is used to allocate a transmission resource greater than one narrowband (NB), where the determining module is further configured to determine an allocated transmission resource based on the first resource allocation manner and the resource indication information; and a transmission module, configured to transmit data by using the allocated transmission resource.

In the third aspect, the transmission resource greater than one NB can be allocated in the first resource allocation manner, and a quantity of RBs allocated to the first node is increased. The first node shown in the third aspect may be configured to execute actions or steps of the first node in the first aspect.

In a possible design, the first node includes a processor and a transceiver, where the processor is configured to perform the resource allocation method provided in the first aspect of this application. Optionally, the first node may further include a memory, where the memory is configured to store application program code that supports the first node in performing the foregoing method, and the processor is configured to execute an application program code stored in the memory.

According to a fourth aspect, an embodiment of the present invention provides a second node, including: a determining module, configured to determine downlink control information (DCI), where the DCI includes resource indication information, the resource indication information is used to determine a first resource allocation manner and an allocated transmission resource for a first node, and the first resource allocation manner is used to allocate a transmission resource greater than one narrowband (NB); and a sending module, configured to send the DCI to the first node.

In the fourth aspect, the transmission resource greater than one NB can be allocated in the first resource allocation manner, and a quantity of RBs allocated to the first node is increased. The second node shown in the fourth aspect may be configured to execute actions or steps of the second node in the second aspect.

In a possible design, the second node includes a processor and a transceiver, where the processor is configured to perform the resource allocation method provided in the second aspect of this application. Optionally, the second node may further include a memory, where the memory is configured to store application program code that supports the second node in performing the foregoing method, and the processor is configured to execute an application program code stored in the memory.

According to a fifth aspect, an embodiment of the present invention provides a computer storage medium, where the computer storage medium is configured to store a computer software instruction used by the first node, and the computer software instruction includes a program designed for executing the foregoing aspects.

According to a sixth aspect, an embodiment of the present invention provides a computer storage medium, where the computer storage medium is configured to store a computer software instruction used by the second node, and the computer software instruction includes a program designed for executing the foregoing aspects.

In the embodiments of the present invention, names of the first node and the second node do not constitute a limitation on the devices themselves. In actual implementation, these devices may have other names. Provided that a function of each device is similar to that in this application, the device falls within the scope of the claims of this application and their equivalent technologies.

In the embodiments of the present invention, the first node receives, from the second node, the DCI including the resource indication information, and determines, based on the resource indication information, the first resource allocation manner used to allocate the transmission resource greater than one narrowband (NB); and the first node determines the allocated transmission resource based on the first resource allocation manner and the resource indication information, and transmits the data by using the allocated transmission resource. In this way, the transmission resource greater than one NB is allocated, and a quantity of RBs allocated to the first node is increased.

BRIEF DESCRIPTION OF THE DRAWINGS

To describe the technical solutions in the embodiments of the present invention or in the background more clearly, the following describes the accompanying drawings required for describing the embodiments of the present invention or the background.

DETAILED DESCRIPTION OF ILLUSTRATIVE EMBODIMENTS

The following describes the embodiments of the present invention with reference to the accompanying drawings in the embodiments of the present invention.

Figure 1:
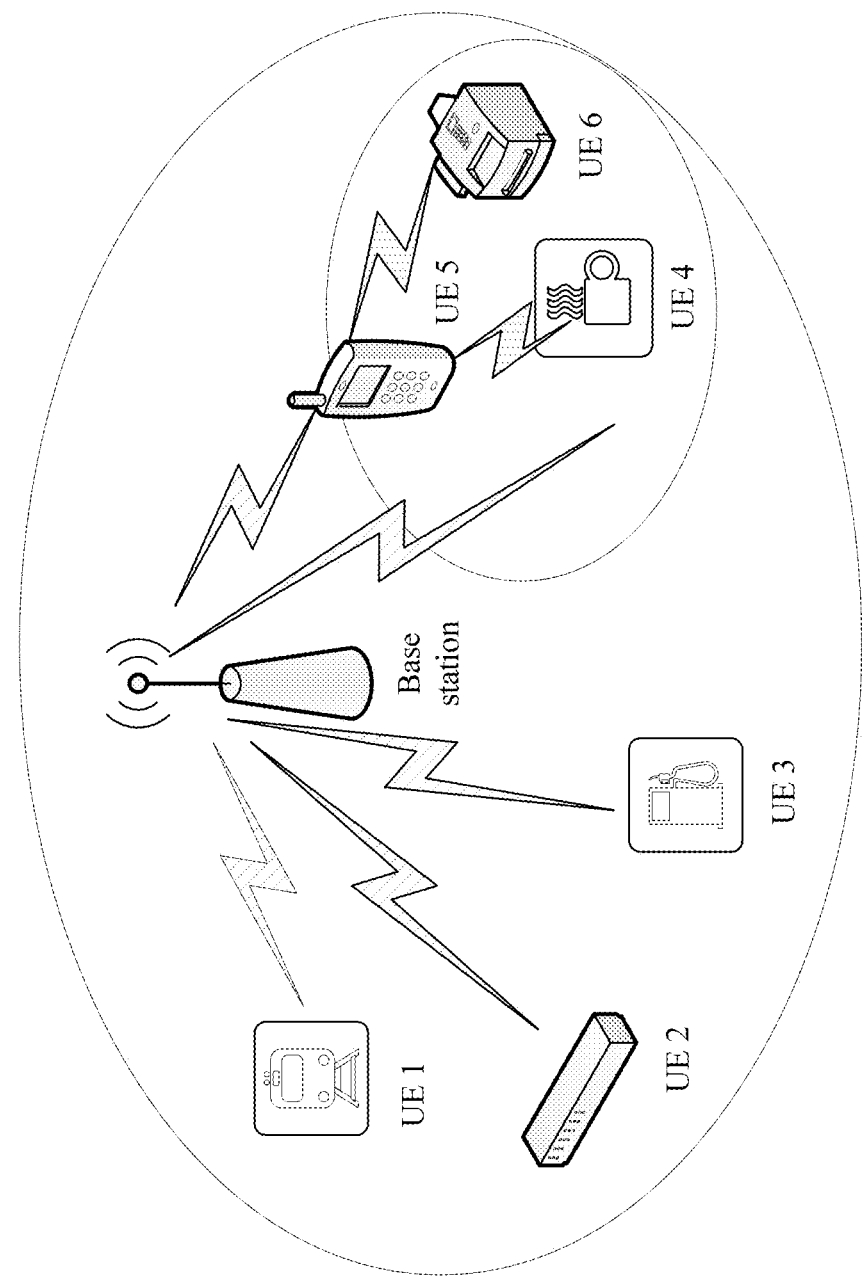
FIG. 1 is a possible network architectural diagram according to an embodiment of the present invention.

Referring to FIG. 1, FIG. 1 is a possible network architectural diagram according to an embodiment of the present invention. As shown in FIG. 1, the network architectural diagram includes a base station (BS) and a plurality of user equipments (UE) such as UE 1, UE 2, . . . , and UE 6. The base station and the UE 1 to the UE 6 constitute a communications system, and the base station may send a scheduling message to one or more UEs in the UE 1 to the UE 6. In addition, the UE 4 to the UE 6 may also constitute a communications system. In the communications system, the UE 5 may send scheduling information to one or both of the UE 4 and the UE 6.

Figure 2:
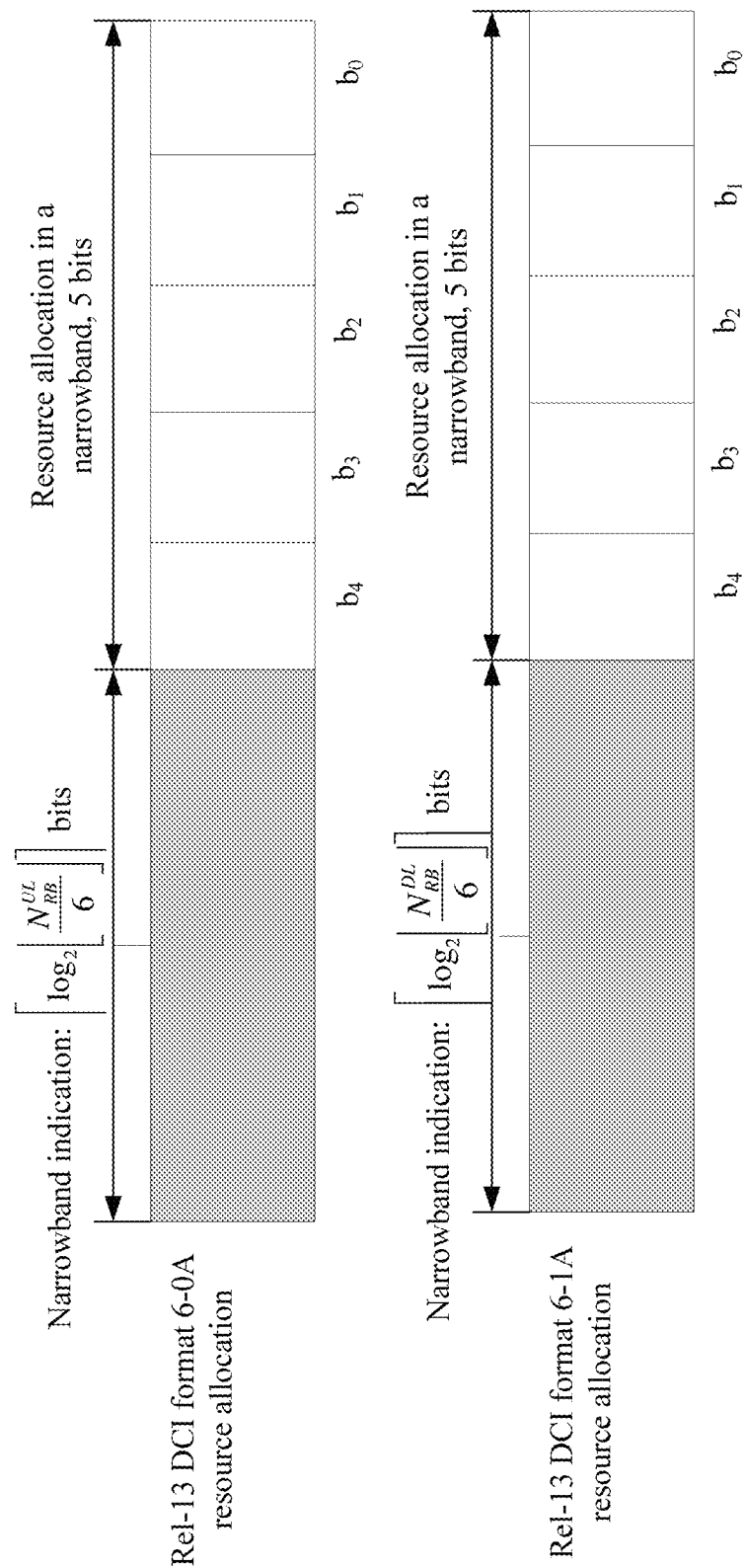
FIG. 2 is an example diagram of resource allocation in a DCI format according to an embodiment of the present invention.

The base station allocates a resource to the UE in a full system bandwidth by using DCI, and a resource allocation field in the DCI may indicate information about the resource allocated to the UE. A DCI format 6-0A is used for indication when an existing base station allocates an uplink resource to Rel-13 BL UE, and a DCI format 6-1A is used for indication when the base station allocates a downlink resource to the Rel-13 BL UE. As shown in FIG. 2, FIG. 2 is an example diagram of resource allocation in a DCI format according to an embodiment of the present invention.

$$\left\lceil \log_2 \left\lfloor \frac{N_{RB}^{UL}}{6} \right\rfloor \right\rceil$$

bits in the DCI during uplink resource allocation and $$\left\lceil \log_2 \left\lfloor \frac{N_{RB}^{DL}}{6} \right\rfloor \right\rceil$$

bits in the DCI during downlink resource allocation are used to indicate an index of an NB allocated in the system bandwidth. $N_{RB}^{UL}$ and $N_{RB}^{DL}$ respectively indicate a quantity of RBs included in an uplink system bandwidth and a quantity of RBs included in a downlink system bandwidth. The last five bits are used to indicate RB allocation in the NB, and a resource indicator value (RIV) corresponding to a binary number of the five bits indicates allocation of consecutive RBs.

Figure 3:
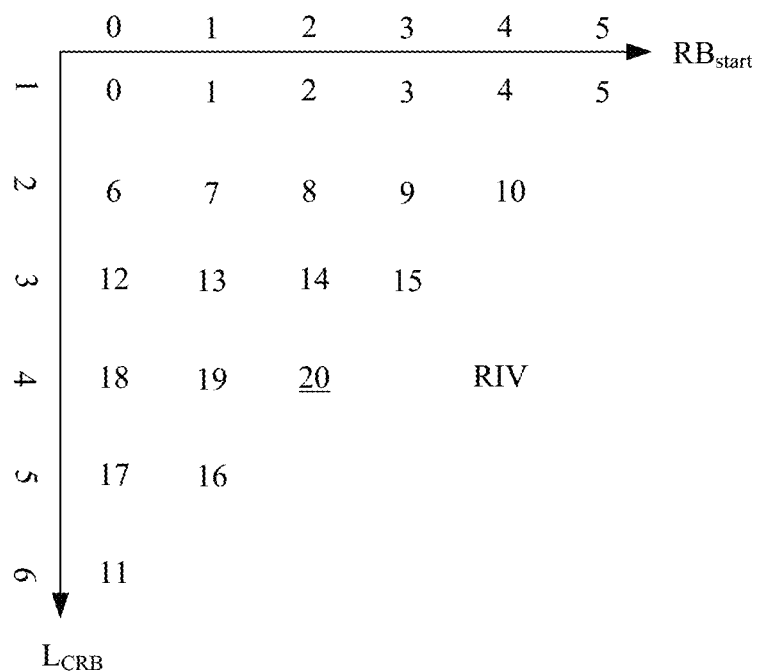
FIG. 3 is an example diagram of RB allocation corresponding to an RIV according to an embodiment of the present invention.

Referring also to FIG. 3, FIG. 3 is an example diagram of RB allocation corresponding to an RIV according to an embodiment of the present invention. Different RIVs are corresponding to different RB starting points and different lengths of consecutive RBs. A lateral axis is an index number of an RB, and a longitudinal axis is a quantity of consecutively allocated RBs. For example, when the RIV corresponding to the binary number of the last five bits is 20, it indicates that the resource allocated to the UE is four consecutive RBs starting from an RB whose index number is 2. Because one NB includes six RBs, there are 21 types of resource allocations at most. A value range of the RIV is [0, 20], that is, a value of the RIV may be 0, or may be 20.

However, it can be learned that an existing technical solution can only indicate allocation of a specific NB in a system bandwidth and an RB in a narrowband. Consequently, a quantity of RBs allocated by a system to a terminal device is limited. In the embodiments of the present invention, a first node receives downlink control information (DCI) from a second node, where the DCI includes resource indication information, and the resource indication information is used to indicate a transmission resource allocation manner; the first node determines a first resource allocation manner based on the resource indication information, where the first resource allocation manner is used to allocate a transmission resource greater than one narrowband (NB); the first node determines an allocated transmission resource based on the first resource allocation manner and the resource indication information; and the first node transmits data by using the allocated transmission resource. In this way, the transmission resource greater than one NB can be allocated, and a quantity of allocated RBs is increased.

In the specification, claims, and accompanying drawings of this application, the terms "first", "second", "third", "fourth", and so on are intended to distinguish between different objects but do not indicate a particular order. Moreover, the terms "including", "comprising", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The embodiments of the present invention may be applied to another communications system in which a resource needs to be allocated by using DCI, for example, an evolved packet system (EPS), a Global System for Mobile communications (GSM), a Code Division Multiple Access (CDMA) system, a Wideband Code Division Multiple Access (WCDMA) system, a general packet radio service (GPRS) system, an LTE frequency division duplex (FDD) system, or an LTE time division duplex (TDD) system.

In the embodiments of the present invention, the first node may be a terminal device having communication and storage functions, and the second node may be a network device providing a communication service for the first node. The terminal device may include but is not limited to a terminal, a mobile station (MS), and the like. The terminal device may be a mobile phone (or referred to as a "cellular" phone), or may be a portable, pocket-sized, handheld, computer built-in, or in-vehicle mobile apparatus (a smart band, a smartwatch, smart glasses, or the like). The network device may include but is not limited to a base station, an access point, and the like.

Based on a network architecture shown in FIG. 1, the first node and the second node in the embodiments of the present invention may have other names. Provided that a function of each device is similar to that in this application, the device falls within the scope of the claims of this application and their equivalent technologies.

Figure 4:
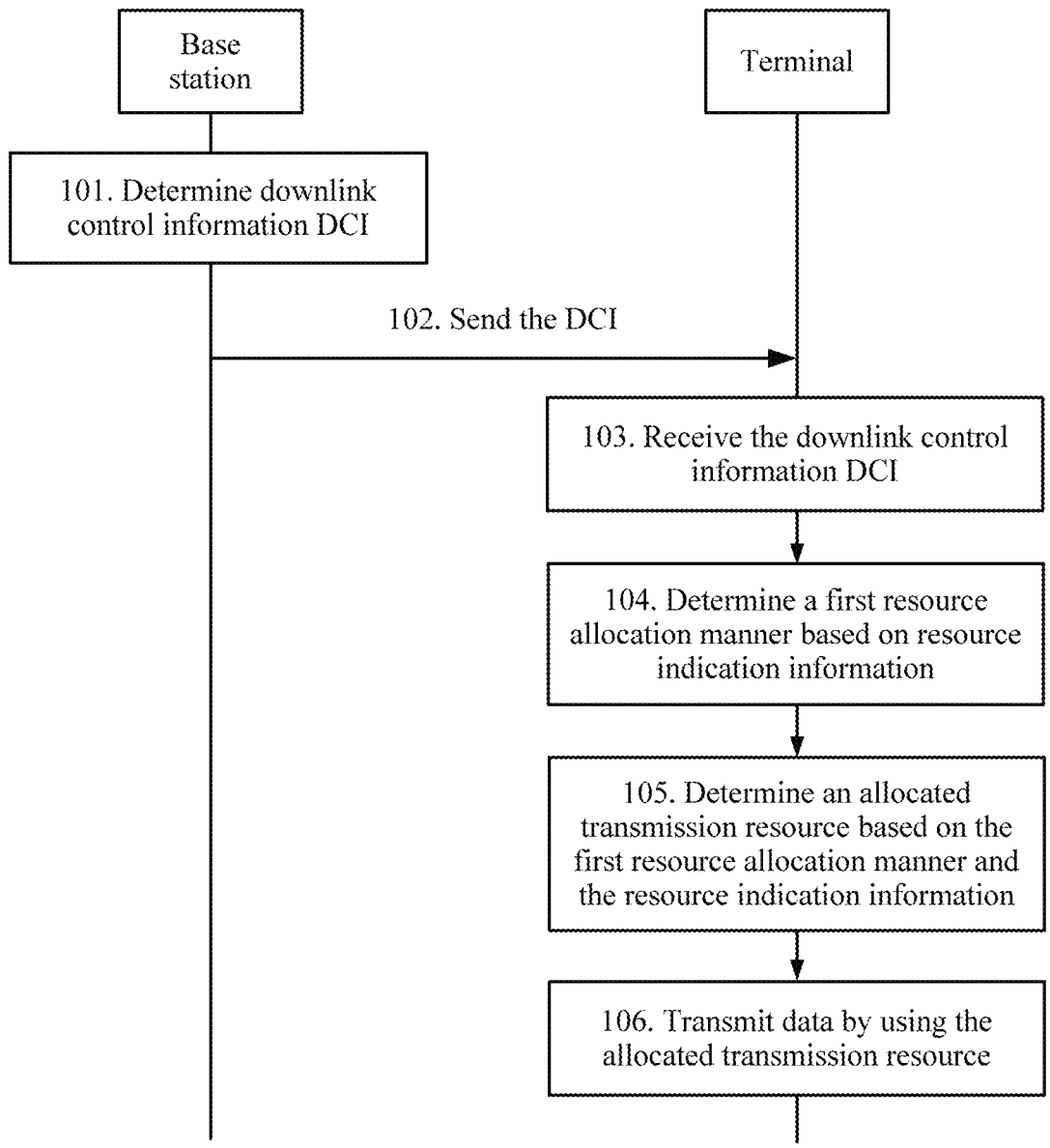
FIG. 4 is a schematic flowchart of a resource allocation method according to an embodiment of the present invention.

Referring to FIG. 4, FIG. 4 is a schematic flowchart of a resource allocation method according to an embodiment of the present invention. As shown in FIG. 4, this embodiment of the present invention is described by using an example in which a second node is a base station, and a first node is a terminal. The method includes step 101 to step 106. For a specific process, refer to the following detailed description.

101. The base station determines downlink control information (DCI).

Specifically, the DCI includes resource indication information, the resource indication information is used to determine a first resource allocation manner and an allocated transmission resource for the terminal, and the first resource allocation manner is used to allocate a transmission resource greater than one narrowband (NB).

Optionally, the base station may determine, based on a resource requirement of the terminal, a resource that needs to be allocated to the terminal. A system bandwidth of the base station includes a plurality of resource block groups (resource block group, RBG), and each RBG includes at least one RB. For example, a quantity of RBs included in one RBG may be 2, 3, or 4.

One NB includes six RBs. When the base station determines to allocate the transmission resource greater than one NB to the terminal, the base station determines that a resource allocation manner is the first resource allocation manner, and further determines the resource indication information corresponding to the allocated transmission resource.

It should be noted that, when the transmission resource is allocated to the terminal in the first resource allocation manner, a field included in the resource indication information, a bit location of the included field in the DCI, the allocated transmission resource, and a bit state of the included field are consistent in the terminal and in the base station sending the DCI to the terminal, so that the terminal can correctly interpret the resource indication information in the DCI after the base station sends the DCI including the resource indication information.

In a possible scheme, the resource indication information includes a first field. Before the base station sends the DCI, when the allocated transmission resource is greater than one NB, the base station determines to use the first resource allocation manner, and sets a value of the first field included in the resource indication information to be within a range of a first state set. In this way, after receiving the DCI, the terminal may determine, by performing determining on the first field, that a transmission resource allocation manner is the first resource allocation manner. Optionally, a quantity of binary bits of the first field is 5, and the first state set includes a 5-bit binary value corresponding to a positive integer within an interval range [21, 31]. The first state set herein includes a 5-bit binary value corresponding to 21 and that corresponding to 31.

In another possible scheme, the resource indication information includes a second field including Z binary bits, and Z is a positive integer. Optionally, when each bit in the Z binary bits is preset to 1, the base station and the terminal may determine that a transmission resource allocation manner is the first resource allocation manner. For example, a quantity of binary bits of the second field is 2. The quantity of binary bits included in the second field and a bit state corresponding to the first resource allocation manner are not limited in this embodiment of the present invention.

In another possible scheme, the resource indication information includes a third field. Optionally, the base station and the terminal may preset a quantity of bits included in the third field and a bit state that are corresponding to the first resource allocation manner. For example, if the third field is a first preset value, it is determined that a transmission resource allocation manner is the first resource allocation manner.

102. The base station sends the DCI to the terminal.

Specifically, the base station sends the DCI to the terminal. Optionally, the base station may send the DCI by using an existing DCI format. For example, the DCI format is a DCI format 6-0A or a DCI format 6-1A. Alternatively, the base station may send the DCI by using a newly defined DCI format. This is not limited in this embodiment of the present invention.

103. Correspondingly, the terminal receives the DCI from the base station, where the DCI includes resource indication information, and the resource indication information is used to indicate a transmission resource allocation manner.

104. The terminal determines a first resource allocation manner based on the resource indication information.

105. The terminal determines an allocated transmission resource based on the first resource allocation manner and the resource indication information.

106. The terminal transmits data by using the allocated transmission resource.

Specifically, the terminal may determine the transmission resource allocation manner by using the resource indication information. In this embodiment of the present invention, the transmission resource allocation manner includes the first resource allocation manner, and the first resource allocation manner is used to allocate the transmission resource greater than one NB. In this way, the transmission resource greater than one NB can be allocated, and a quantity of RBs allocated to the terminal is increased. A terminal that can support a relatively large bandwidth can also transmit data by using a transmission resource greater than one NB.

In a possible embodiment, the resource indication information includes the first field and a fourth field. When the terminal receives the DCI including the resource indication information, and determines, by using the first field, that the transmission resource allocation manner is the first resource allocation manner, the terminal determines a resource indicator value based on the first field and the fourth field, and searches for one or more corresponding target RBGs based on the determined resource indicator value. The resource indicator value is used to indicate a start RBG and a quantity of consecutive RBGs starting from the start RBG. A correspondence between the resource indicator value and the one or more target RBGs is preset, and may be set by the base station and notified to the terminal, or may be determined by the base station and the terminal through negotiation.

For example, that the terminal determines a resource indicator value based on the first field and the fourth field may be specifically: calculating, by the terminal, a first intermediate indicator value based on the first field and the fourth field by using a first calculation formula; and determining, based on a preset first mapping relationship, a resource indicator value corresponding to the first intermediate indicator value. The first calculation formula is:

$$X_1 = 11 * M_1 + (N_1 - 21), \text{ where}$$

$M_1$ represents a decimal number corresponding to a binary value of the fourth field, $N_1$ represents a decimal number corresponding to a binary value of the first field, and $X_1$ represents the first intermediate indicator value.

Further, when the system bandwidth of the base station includes 96 RBs, and a maximum bandwidth supported by the terminal is 96 RBs, if each RBG is set to include six RBs, the first mapping relationship may be:

$$RIV = X_1 + 16, \text{ where}$$

RIV represents the resource indicator value.

When the system bandwidth of the base station includes 96 RBs, and a maximum bandwidth supported by the terminal is 24 RBs, if each RBG is set to include three RBs, the first mapping relationship may be:

$$i_1 = \left\lfloor \frac{X_1}{55} \right\rfloor$$

$$j_1 = \left\lfloor \frac{X_1 - 55 * i_1}{30 - i} \right\rfloor * (5 - 2 * i_1) + i_1$$

$$RIV = X_1 - \left\lfloor \frac{X_1 - 55 * i_1}{30 - i} \right\rfloor * (30 - i_1) - 55 * i_1 + 32 * (2 + j_1), \text{ where}$$

where $i_1$ represents a parameter calculated based on the first intermediate indicator value $X_1$, $j_1$ represents a parameter calculated based on the first intermediate indicator value $X_1$, and RIV represents the resource indicator value; or the first mapping relationship may be:

$$RIV = X_1 + \text{Offset}(X_1), \text{ where}$$

RIV represents the resource indicator value, and Offset $(X_1)$ represents a predefined offset of the resource indicator value RIV relative to the first intermediate indicator value $X_1$.

It should be noted that in any one of the cases listed above, a unique first intermediate indicator value may be determined based on the first field and the fourth field, and then a unique resource indicator value may be determined based on the first intermediate indicator value, so that one or more corresponding target RBGs can be found by using the determined unique resource indicator value. The foregoing description is merely an example, and a manner of determining a unique resource indicator value based on the first field and the fourth field is not limited in this embodiment of the present invention.

In another possible embodiment, the resource indication information includes the third field and a fifth field. When the terminal receives the DCI including the resource indication information, and determines, by using the third field, that the transmission resource allocation manner is the first resource allocation manner, the terminal determines a resource indicator value based on the third field and the fifth field, and searches for one or more corresponding target RBGs based on the determined resource indicator value. The resource indicator value is used to indicate a start RBG and a quantity of consecutive RBGs starting from the start RBG. A correspondence between the resource indicator value and the one or more target RBGs is preset, and may be set by the base station and notified to the terminal, or may be determined by the base station and the terminal through negotiation.

For example, that the terminal determines a resource indicator value based on the third field and the fifth field may be specifically: calculating, by the terminal, a second intermediate indicator value based on the fifth field by using a second calculation formula; and determining, based on a preset second mapping relationship, a resource indicator value corresponding to the second intermediate indicator value. The fifth field includes a first sub-field and a second sub-field, and the second calculation formula is:

$$X_2 = 32 * M_2 + N_2, \text{ where}$$

$M_2$ represents a decimal number corresponding to a binary value of the first sub-field, $N_2$ represents a decimal number corresponding to a binary value of the second sub-field, and $X_2$ represents the second intermediate indicator value.

Further, when the system bandwidth of the base station includes 96 RBs, and a maximum bandwidth supported by the terminal is 96 RBs, if each RBG is set to include three RBs, the second mapping relationship may be:

$$RIV = X_2 + 63, \text{ where}$$

RIV represents the resource indicator value.

When the system bandwidth of the base station includes 96 RBs, and a maximum bandwidth supported by the terminal is 24 RBs, if each RBG is set to include two RBs, the second mapping relationship may be:

$$i_2 = \left\lfloor \frac{X_2}{82} \right\rfloor$$

$$j_2 = \left\lfloor \frac{X_2 - 82 * i_2}{45 - i} \right\rfloor * (8 - 2 * i_2) + i_2$$

$$RIV = X_2 - \left\lfloor \frac{X_2 - 82 * i_2}{45 - i_2} \right\rfloor * (45 - i_2) - 82 * i_2 + 48 * (3 + j_2), \text{ where}$$

$i_2$ represents a parameter calculated based on the second intermediate indicator value $X_2$, $j_2$ represents a parameter calculated based on the second intermediate indicator value $X_2$, and RIV represents the resource indicator value; or the second mapping relationship may be:

$RIV = X_2 + \text{Offset}(X_2)$, where

RIV represents the resource indicator value, and Offset$(X_2)$ represents a predefined offset of the resource indicator value RIV relative to the second intermediate indicator value $X_2$.

It should be noted that in any one of the cases listed above, a unique second intermediate indicator value may be determined based on the fifth field, and then a unique resource indicator value may be determined based on the second intermediate indicator value, so that one or more corresponding target RBGs can be found by using the determined unique resource indicator value. The foregoing description is merely an example, and a manner of determining a unique resource indicator value based on the fifth field is not limited in this embodiment of the present invention.

In another possible embodiment, the resource indication information includes the second field and a sixth field. When the terminal receives the DCI including the resource indication information, and determines, by using the second field, that the transmission resource allocation manner is the first resource allocation manner, the terminal determines a resource indicator value based on the sixth field, and searches for one or more corresponding target RBGs based on the determined resource indicator value. The resource indicator value is used to indicate a start RBG and a quantity of consecutive RBGs starting from the start RBG. A correspondence between the resource indicator value and the one or more target RBGs is preset, and may be set by the base station and notified to the terminal, or may be determined by the base station and the terminal through negotiation.

For example, that the terminal determines a resource indicator value based on the sixth field may be specifically: calculating, by the terminal, a third intermediate indicator value based on the sixth field by using a third calculation formula; and determining, based on a preset third mapping relationship, a resource indicator value corresponding to the third intermediate indicator value. The sixth field includes a third sub-field and a fourth sub-field, and the third calculation formula is:

$X_3 = 8 * M_3 + N_3$, where $M_3$ represents a decimal number corresponding to a binary value of the third sub-field, $N_3$ represents a decimal number corresponding to a binary value of the fourth sub-field, and $X_3$ represents the third intermediate indicator value.

Further, when the system bandwidth of the base station includes 96 RBs, and a maximum bandwidth supported by the terminal is 96 RBs, if each RBG is set to include six RBs, the third mapping relationship may be:

$RIV = X_3 + 16$, where

RIV represents the resource indicator value.

When the system bandwidth of the base station includes 96 RBs, and a maximum bandwidth supported by the terminal is 24 RBs, if each RBG is set to include three RBs, the third mapping relationship may be:

$$i_3 = \left\lfloor \frac{X_3}{28} \right\rfloor$$

$$j_3 = \left\lfloor \frac{X_3 - 28 * i_3}{15 - \left\lfloor \frac{i}{2} \right\rfloor} \right\rfloor * (5 - 2 * i_3) + i_3$$

$$RIV = 2 * \left( X_3 - \left\lfloor \frac{X_3 - 28 * i_3}{15 - \left\lfloor \frac{i_3}{2} \right\rfloor} \right\rfloor * \left(15 - \left\lfloor \frac{1}{2} \right\rfloor\right) - 28 * i_3 \right) + 32 * (2 + j_3), \text{ where}$$

$i_3$ represents a parameter calculated based on the third intermediate indicator value $X_3$, $j_3$ represents a parameter calculated based on the third intermediate indicator value $X_3$, and RIV represents the resource indicator value; or the third mapping relationship may be:

$RIV = X_3 + \text{Offset}(X_3)$, where

RIV represents the resource indicator value, and Offset$(X_3)$ represents a predefined offset of the resource indicator value RIV relative to the third intermediate indicator value $X_3$.

It should be noted that in any one of the cases listed above, a unique third intermediate indicator value may be determined based on the sixth field, and then a unique resource indicator value may be determined based on the third intermediate indicator value, so that one or more corresponding target RBGs can be found by using the determined unique resource indicator value. The foregoing description is merely an example, and a manner of determining a unique resource indicator value based on the sixth field is not limited in this embodiment of the present invention.

Further, a case in which the terminal interprets, after receiving the DCI, the DCI to determine the allocated transmission resource is described above in detail. In step 101, determining the DCI by the base station may be determining the resource allocation manner, the field in the DCI, and the bit state included in the field based on a reverse process of interpreting the DCI by the terminal. Specifically, first, the base station determines, based on a current resource requirement and the maximum bandwidth that can be supported by the terminal, the transmission resource allocated to the terminal, that is, determines the allocated start RBG and the quantity of consecutive RBGs starting from the start RBG. Then, the base station determines the resource indicator value of the allocated transmission resource, for example, may search a correspondence between the RIV and the start RBG and the quantity of consecutive RBGs starting from the start RBG for the RIV corresponding to the allocated transmission resource. Finally, the base station determines the resource indication information in the DCI based on the RIV, and sends the DCI including the resource indication information to the terminal.

It should be noted that determining the resource indication information in the DCI by the base station based on the RIV may be a reverse process of determining the RIV by the terminal based on the resource indication information. For example, when the resource indication information includes the first field and the fourth field, if the base station allocates the transmission resource greater than one NB to the terminal, the base station determines the first intermediate indicator value based on the RIV, and determines binary values of the first field and the fourth field based on the first intermediate indicator value, that is, determines the resource indicator value. Herein is an example for description. In this embodiment of the present invention, the base station may determine the resource indication information based on the RIV according to a reverse process of determining the RIV by the terminal in another manner. This is not limited in this embodiment of the present invention.

In this embodiment of the present invention, the terminal receives, from the base station, the DCI including the resource indication information, and determines, based on the resource indication information, the first resource allocation manner used to allocate the transmission resource greater than one narrowband (NB); and the terminal determines the allocated transmission resource based on the first resource allocation manner and the resource indication information, and transmits the data by using the allocated transmission resource. In this way, the transmission resource greater than one NB is allocated, and a quantity of RBs allocated to the terminal is increased.

Figure 5:
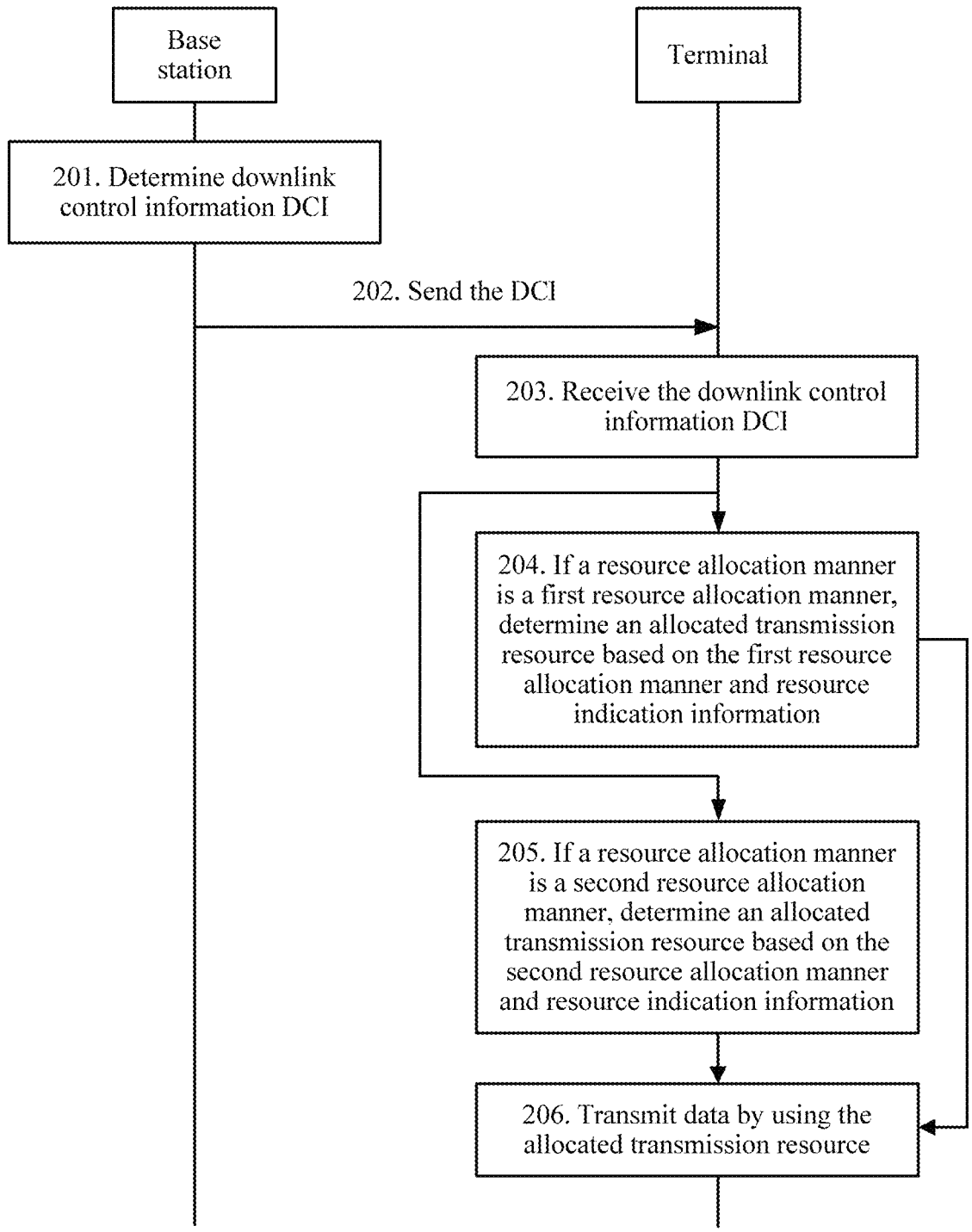
FIG. 5 is a schematic flowchart of another resource allocation method according to an embodiment of the present invention.

Referring to FIG. 5, FIG. 5 is a schematic flowchart of another resource allocation method according to an embodiment of the present invention. As shown in FIG. 5, this embodiment of the present invention is described by using an example in which a first node is a terminal, and a second node is a base station. The method includes step 201 to step 206. For a specific process, refer to the following detailed description.

201. The base station determines downlink control information (DCI).

202. The base station sends the DCI to the terminal.

203. The terminal receives the DCI from the base station, where the DCI includes resource indication information, and the resource indication information is used to indicate a transmission resource allocation manner.

204. If the terminal determines, based on the resource indication information, that a resource allocation manner of allocating a transmission resource is a first resource allocation manner, determine an allocated transmission resource based on the first resource allocation manner and the resource indication information.

205. If the terminal determines, based on the resource indication information, that a resource allocation manner of allocating a transmission resource is a second resource allocation manner, determine an allocated transmission resource based on the second resource allocation manner and the resource indication information.

206. The terminal transmits data by using the allocated transmission resource.

The first resource allocation manner is used to allocate a transmission resource greater than one NB, and the second resource allocation manner is used to allocate a transmission resource less than or equal to one NB. The resource indication information may be used to indicate the transmission resource allocation manner. For example, the resource indication information is used to indicate that the transmission resource allocation manner is the first resource allocation manner, or the resource indication information is used to indicate that the transmission resource allocation manner is the second resource allocation manner. In this way, after receiving the DCI including the resource indication information, the terminal may interpret the DCI to determine the transmission resource allocation manner based on the resource indication information, and determine the allocated transmission resource, so as to transmit the data by using the allocated transmission resource. Further, transmitting the data herein may be receiving the data or sending the data, which is determined based on the transmission resource allocated by the base station. If the base station allocates an uplink transmission resource, the terminal sends the data by using the allocated uplink transmission resource. If the base station allocates a downlink transmission resource, the terminal receives the data by using the allocated downlink transmission resource.

In a possible embodiment, the resource indication information includes a first field and a fourth field. If a value of the first field belongs to a first state set, the terminal determines that the transmission resource allocation manner is the first resource allocation manner. If the value of the first field belongs to a second state set, the terminal determines that the transmission resource allocation manner is the second resource allocation manner. Optionally, bit locations of the first field and the fourth field may be bit locations included in the existing DCI. In this way, the transmission resource greater than one NB can be allocated without increasing bit overheads, so as to enhance effective utilization of each bit in the DCI.

Figure 6:
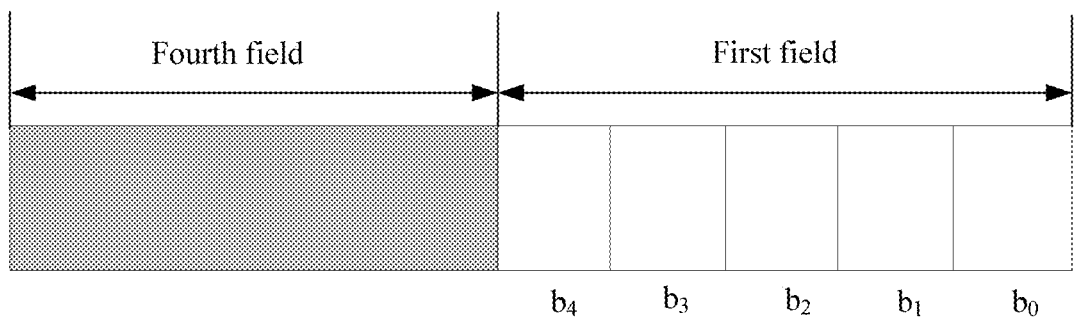
FIG. 6 is an example diagram of resource allocation in another DCI format according to an embodiment of the present invention.

For example, referring to FIG. 6, FIG. 6 is an example diagram of resource allocation in a DCI format according to an embodiment of the present invention. It can be learned that a quantity of binary bits of the first field is 5, that is, $b_4 b_3 b_2 b_1 b_0$, which is the same as a quantity of bits used for resource allocation in an existing technical solution. Because 21 bit states are used in the existing technical solution to allocate a transmission resource in the second resource allocation manner, the remaining 11 bit states may be used for the first resource allocation manner. Optionally, bit states of $b_4 b_3 b_2 b_1 b_0$ are divided into 21 bit states and 11 bit states, which are respectively corresponding to the second state set and the first state set. For example, the first state set includes a 5-bit binary value corresponding to a positive integer within an interval range [21, 31]. The second state set includes a 5-bit binary value corresponding to a positive integer within an interval range [0, 20]. The first state set includes a bit state corresponding to 21 and a bit state corresponding to 31, and the second state set includes a bit state corresponding to 0 and a bit state corresponding to 20. Herein is merely an example for description. Bit state division of $b_4 b_3 b_2 b_1 b_0$ is not limited in this embodiment of the present invention.

Further, the fourth field includes $$\left\lceil \log_2 \left\lfloor \frac{N_{RB}^{UL}}{6} \right\rfloor \right\rceil \left( \left\lceil \log_2 \left\lfloor \frac{N_{RB}^{DL}}{6} \right\rfloor \right\rceil \right)$$

in downlink) bits. When the allocated transmission resource is determined based on the second resource allocation manner and the resource indication information, the existing technical solution may be used, that is, an NB index of an NB may be determined based on the fourth field, and a resource indicator value may be determined based on a binary number of $b_4 b_3 b_2 b_1 b_0$, so as to determine the allocated transmission resource. When the allocated transmission resource is determined based on the first resource allocation manner and the resource indication information, in an optional scheme, a first intermediate indicator value is calculated according to a first calculation formula, the $$\left\lceil \log_2 \left\lfloor \frac{N_{RB}^{UL}}{6} \right\rfloor \right\rceil \left( \left\lceil \log_2 \left\lfloor \frac{N_{RB}^{DL}}{6} \right\rfloor \right\rceil \right)$$

in downlink) bits included in the fourth field, and $b_4b_3b_2b_1b_0$ included in the first field, and a resource indicator value corresponding to the first intermediate indicator value is determined based on a preset first mapping relationship. It can be understood that a larger quantity of used bits indicates more included bit states, and therefore the allocated transmission resource is indicated by using the fourth field and the first field jointly, so as to indicate allocation of more transmission resources.

Optionally, the first calculation formula is:

$X_1=11*M+(N_1-21)$, where $M_1$ represents a decimal number corresponding to a binary value of the fourth field, $N_1$ represents a decimal number corresponding to a binary value of the first field, and $X_1$ represents the first intermediate indicator value. Because there are only 11 bit states in the first field in the first resource allocation manner, there are 11 possibilities for each bit state of the fourth field. Therefore, the first intermediate indicator value calculated in this manner can reflect all bit states included in the first field and the fourth field, a minimum value of the first intermediate indicator value may be 0, and the first intermediate indicator value may range between consecutive integers. The first calculation formula herein is an optional formula, and the first calculation formula is not limited in this embodiment of the present invention.

In actual application, a system bandwidth may be 20 MHz, 15 MHz, 10 MHz, 5 MHz, 3 MHz, or the like, and a maximum bandwidth that can be supported by the terminal may be 20 MHz, 5 MH, or the like. For different system bandwidths of the base station and different maximum bandwidths that can be supported by the terminal, different first mapping relationships between different first intermediate indicator values and different resource indicator values may be set, to implement a one-to-one correspondence between the first intermediate indicator values and the resource indicator values.

Figure 7A:
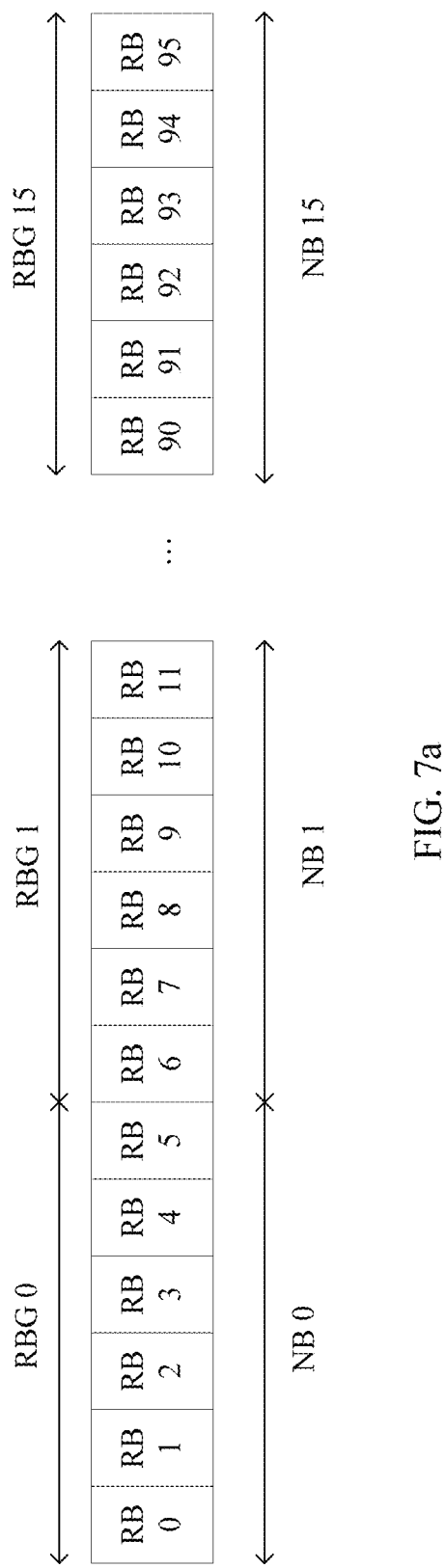
FIG. 7a is an example diagram of an RBG in a 20 MHz bandwidth according to an embodiment of the present invention.
Figure 7B:
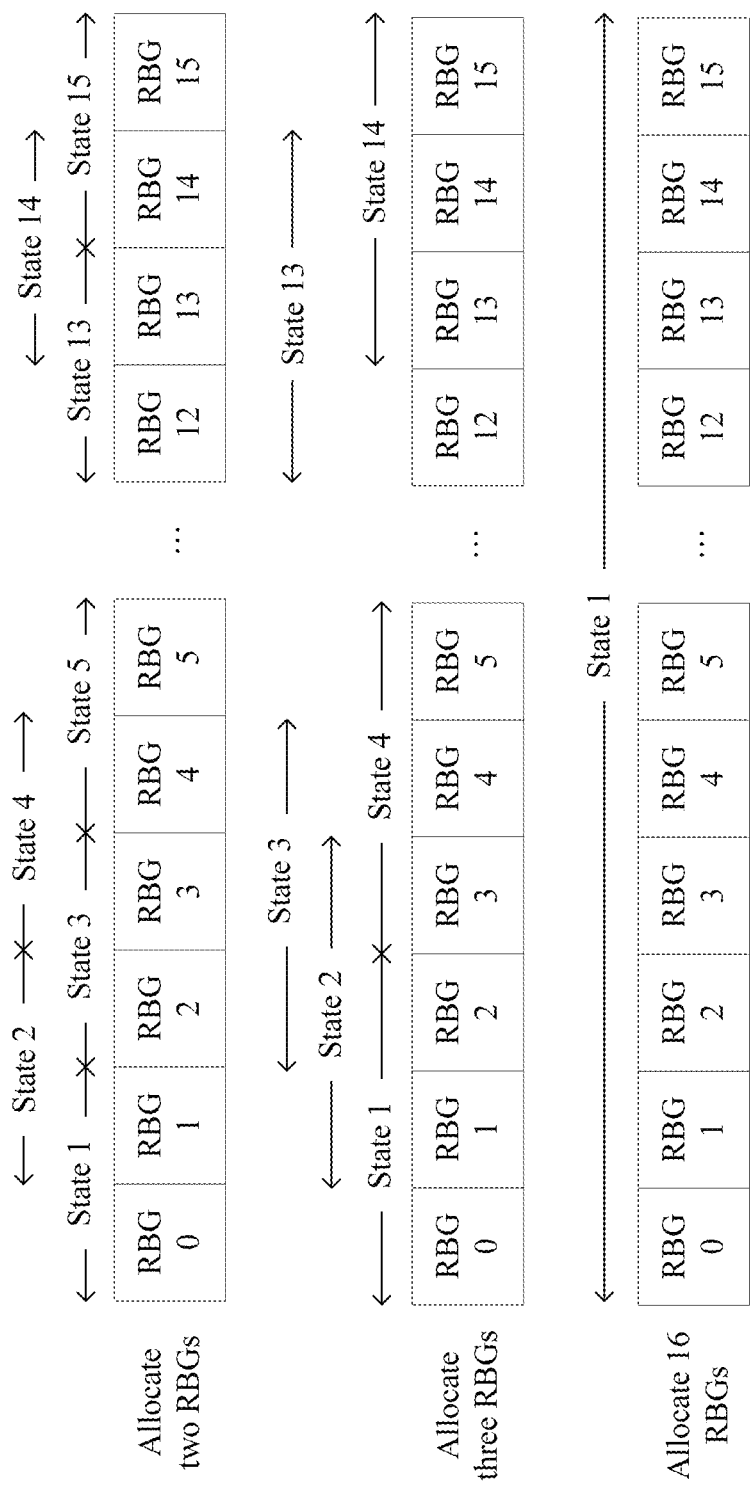
FIG. 7b is an example diagram of a state of an RBG according to an embodiment of the present invention.

For example, if the system bandwidth is 20 MHz, and the maximum bandwidth that can be supported by the terminal is 20 MHz (20 MHz is corresponding to 16 NBs, one NB includes six RBs, and therefore there are totally 96 RBs), one RBG is set to include six consecutive RBs. The base station can learn of the maximum bandwidth that can be supported by the terminal, and both the terminal and the base station may determine a quantity of RBs included in one RBG. As shown in FIG. 7a, FIG. 7a is an example diagram of an RBG in a 20 MHz bandwidth according to an embodiment of the present invention. Optionally, a transmission resource within one NB is allocated in the second resource allocation manner. Therefore, when the transmission resource is allocated in the first resource allocation manner, only allocation of a resource greater than one NB may be indicated. In this case, in the first resource allocation manner, only a scenario in which two RBGs (12 RBs), three RBGs (18 RBs), . . . , or 16 RBGs (96 RBs) are allocated needs to be considered. The system bandwidth includes 16 (obtained by dividing 96 by 6) RBGs. Therefore, there are totally 120 (15+14+ . . . +1) allocation states. As shown in FIG. 7b, FIG. 7b is an example diagram of a state of an RBG according to an embodiment of the present invention. Further, because the system bandwidth is 20 MHz, a quantity $$\left\lceil \log_2 \left\lfloor \frac{N_{RB}^{UL}}{6} \right\rfloor \right\rceil \left( \left\lceil \log_2 \left\lfloor \frac{N_{RB}^{DL}}{6} \right\rfloor \right\rceil \right)$$

in downlink) of binary bits included in the fourth field is 4, and the first intermediate indicator value determined according to the first calculation formula totally includes 176 states. Therefore, a value range of the first intermediate indicator value is enough to support 120 possibilities. Optionally, the first intermediate indicator value ranges from 0 to 119 (including 0 and 119).

Figure 7C:
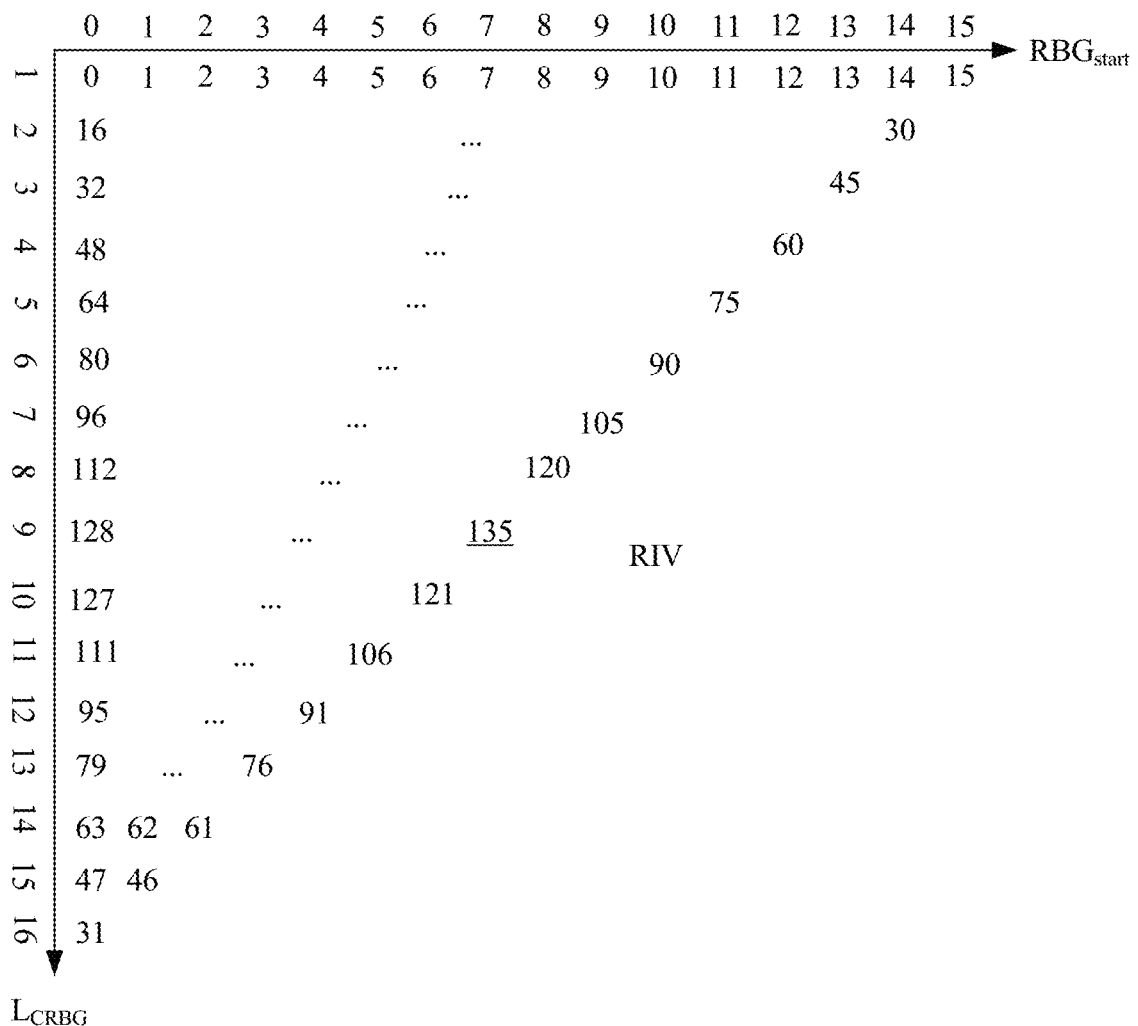
FIG. 7c is an example diagram of RB allocation corresponding to an RIV according to an embodiment of the present invention.

Further, if the system bandwidth is 20 MHz, and the maximum bandwidth that can be supported by the terminal is 20 MHz, optionally, the preset first mapping relationship may be $RIV=X_1+16$ The first mapping relationship needs to ensure that the first intermediate indicator values are in a one-to-one correspondence with the RIVs, and the first mapping relationship is not limited in this embodiment of the present invention. For example, if a value of the RIV starts from 0, and the transmission resource less than or equal to one NB is determined in the second resource allocation manner, one RBG is equivalent to one NB. Therefore, one consecutive RBG starting from a start RBG does not need to be indicated by using the first resource allocation manner. Therefore, referring to FIG. 7c, FIG. 7c is another example diagram of RB allocation corresponding to an RIV according to an embodiment of the present invention. A value of each RIV is corresponding to a unique start RBG and a unique quantity of consecutive RBGs starting from the start RBG. Further, based on the foregoing consideration, in the first row in FIG. 7c, the transmission resource does not need to be allocated in the first resource allocation manner. Therefore, a range of the RIV is [16, 135]. Further, a range of the first intermediate indicator value is [0, 119] in the foregoing example, and therefore the one-to-one correspondence between the first intermediate indicator values and the resource indicator values may be implemented by using $RIV=X_1+16$.

Further, the one-to-one correspondence between the resource indicator values and the first intermediate indicator values may be established by using the foregoing method. After determining to allocate the transmission resource to the terminal, and determining that the transmission resource allocation manner is the first resource allocation manner, the base station determines, based on the to-be-allocated transmission resource, the bit states corresponding to the first field and the fourth field in the DCI. The terminal receives the DCI, obtains the first intermediate indicator value through calculation based on the bit states corresponding to the first field and the fourth field, determines, based on the first mapping relationship, the RIV corresponding to the first intermediate indicator value, and determines, based on the RIV, the start RBG for resource allocation and the quantity of consecutive RBGs starting from the start RBG, so as to determine the transmission resource allocated by the base station.

Figure 8A:
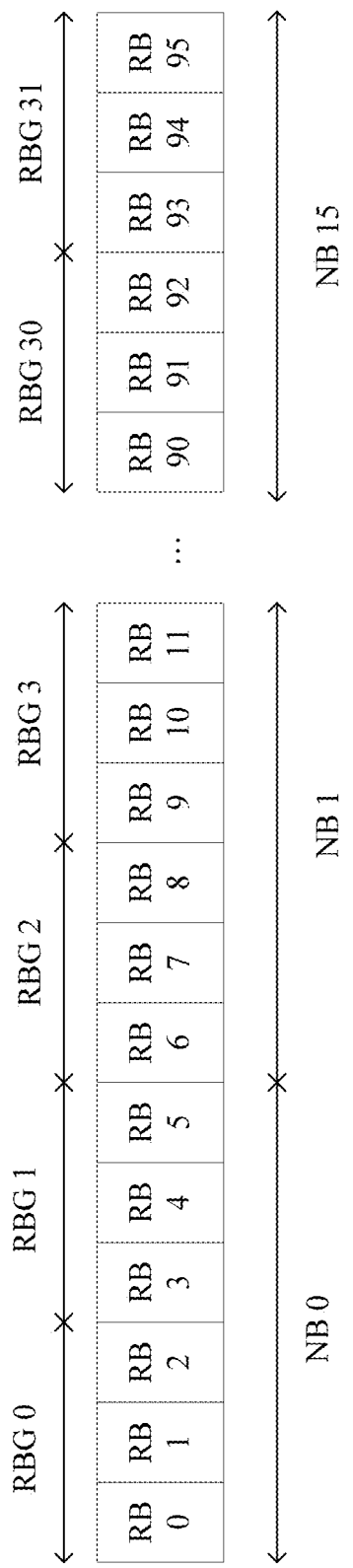
FIG. 8a is another example diagram of an RBG in a 20 MHz bandwidth according to an embodiment of the present invention.
Figure 8B:
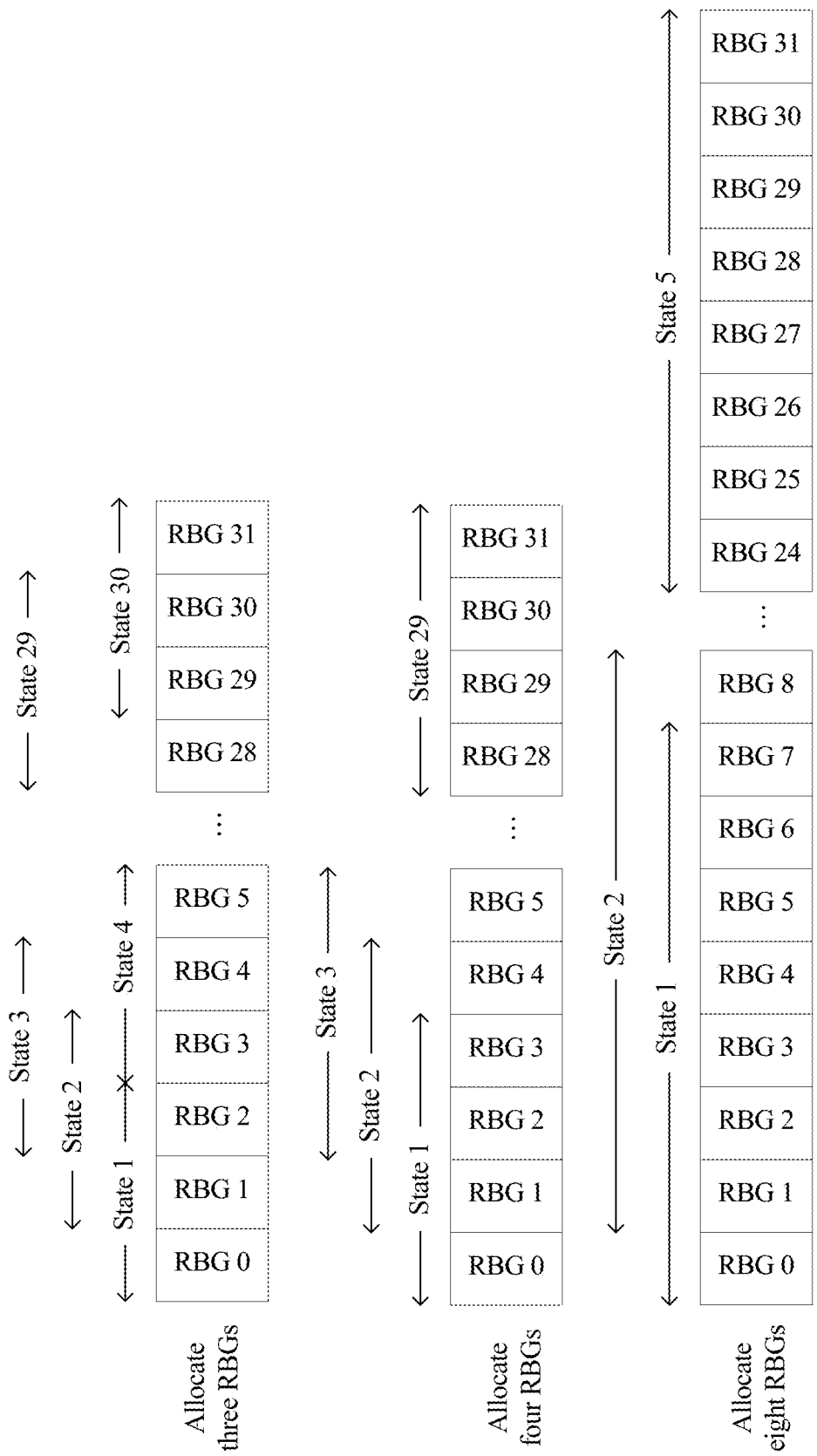
FIG. 8b is another example diagram of a state of an RBG according to an embodiment of the present invention.

For another example, if the system bandwidth is 20 MHz, and the maximum bandwidth that can be supported by the terminal is 5 MHz (5 MHz is corresponding to eight NBs, and there are totally 24 RBs), one RBG is set to include three consecutive RBs. As shown in FIG. 8a, FIG. 8a is another example diagram of an RBG in a 20 MHz bandwidth according to an embodiment of the present invention. Optionally, a transmission resource within one NB is allocated in the second resource allocation manner. Therefore, when the transmission resource is allocated in the first resource allocation manner, only allocation of a resource greater than one NB may be indicated. In this case, in the first resource allocation manner, only a scenario in which three RBGs (9 RBs), four RBGs (12 RBs), . . . , or eight RBGs (24 RBs) are allocated needs to be considered. The system bandwidth includes 32 (obtained by dividing 96 by 3) RBGs. Therefore, there are totally 165 (30+29+ . . . +25) states. As shown in FIG. 8b, FIG. 8b is another example diagram of a state of an RBG according to an embodiment of the present invention. Further, because the system bandwidth is 20 MHz, a quantity $$\left\lceil \log_2 \left\lfloor \frac{N_{RB}^{UL}}{6} \right\rfloor \right\rceil \left( \left\lceil \log_2 \left\lfloor \frac{N_{RB}^{DL}}{6} \right\rfloor \right\rceil \right)$$

in downlink) of binary bits included in the fourth field is 4, and the first intermediate indicator value determined according to the first calculation formula totally includes 176 states. Therefore, a value range of the first intermediate indicator value is enough to support 165 possibilities. Optionally, the first intermediate indicator value ranges from 0 to 164 (including 0 and 164).

Further, if the system bandwidth is 20 MHz, and the maximum bandwidth that can be supported by the terminal is 5 MHz, optionally, the preset first mapping relationship may be:

$$i_1 = \left\lfloor \frac{X_1}{55} \right\rfloor$$

$$j_1 = \left\lfloor \frac{X_1 - 55 * i_1}{30 - i} \right\rfloor * (5 - 2 * i_1) + i_1$$

$$RIV = X_1 - \left\lfloor \frac{X_1 - 55 * i_1}{30 - i} \right\rfloor * (30 - i_1) - 55 * i_1 + 32 * (2 + j_1), \text{ where}$$

$i_1$ represents a parameter calculated based on the first intermediate indicator value $X_1$, $j_1$ represents a parameter calculated based on the first intermediate indicator value $X_1$, and RIV represents the resource indicator value. $i_1$ and $j_1$ are integer intermediate variables. Specifically, after the first intermediate indicator value is calculated, $i_1$ and $j_1$ are calculated based on the first intermediate indicator value, and the resource indicator value is calculated based on the first intermediate indicator value, $i_1$, and $j_1$. The foregoing formula may be represented by Table 1, which is shown in Table 1. It can be learned that by using the foregoing formula, $i_1$ and $j_1$ may be corresponding to a quantity of consecutive RBGs, and the first intermediate indicator values may be in a one-to-one correspondence with the resource indicator values.

TABLE 1

| Quantity of Consecutive RBCs | Quantity of States | $i_1$ | $j_1$ | $X_1$ | RIV |
|---|---|---|---|---|---|
| 3 | 30 | 0 | 0 | 0 to 29 | 64 to 93 |
| 8 | 25 | | 5 | 30 to 54 | 224 to 248 |
| 4 | 29 | 1 | 1 | 55 to 83 | 96 to 124 |
| 7 | 26 | | 4 | 84 to 109 | 192 to 217 |
| 5 | 28 | 2 | 2 | 110 to 137 | 128 to 155 |
| 6 | 27 | | 3 | 138 to 164 | 160 to 186 |

If the system bandwidth is 20 MHz, and the maximum bandwidth that can be supported by the terminal is 5 MHz, optionally, the preset first mapping relationship may be:

RIV=$X_1$+Offset($X_1$), where

RIV represents the resource indicator value, and Offset ($X_1$) represents a predefined offset of the resource indicator value RIV relative to the first intermediate indicator value $X_1$. Optionally, because the first intermediate indicator value ranges from 0 to 164, in an optional scheme, an offset may be specified for first intermediate indicator values in different ranges, and it is ensured that the first intermediate indicator values are in a one-to-one correspondence with the RIVs. An offset indicated by a first intermediate indicator value in each range is not limited in this embodiment of the present invention. For example, referring to Table 2, Table 2 provides a possible correspondence between a first intermediate indicator value and an RIV.

TABLE 2

| Quantity of Consecutive RBCs | Quantity of States | $X_1$ | RIV | Offset($X_1$) |
|---|---|---|---|---|
| 3 | 30 | 0 to 29 | 64 to 93 | 64 |
| 4 | 29 | 30 to 58 | 96 to 124 | 66 |
| 5 | 28 | 59 to 86 | 128 to 155 | 69 |
| 6 | 27 | 87 to 113 | 160 to 186 | 73 |
| 7 | 26 | 114 to 139 | 192 to 217 | 78 |
| 8 | 25 | 140 to 164 | 224 to 248 | 84 |

The one-to-one correspondence between the resource indicator values and the first intermediate indicator values may be established by using the foregoing method. After determining to allocate the transmission resource to the terminal, and determining that the resource allocation manner is the first resource allocation manner, the base station determines, based on the to-be-allocated transmission resource, the bit states corresponding to the first field and the fourth field in the DCI. The terminal receives the DCI, obtains the first intermediate indicator value through calculation based on the bit states corresponding to the first field and the fourth field, determines, based on the first mapping relationship, the RIV corresponding to the first intermediate indicator value, and determines, based on the RIV, the start RBG for resource allocation and the quantity of consecutive RBGs starting from the start RBG, so as to determine the transmission resource allocated by the base station.

Further, for different system bandwidths, RBGs including different quantities of RBs, and different maximum bandwidths supported by the terminal, a maximum quantity of available states of the determined first intermediate indicator value is different, and a quantity of RBGs that can be allocated in the first resource allocation manner is different. Referring to Table 3, Table 3 is a table of a possible resource allocation situation in the first resource allocation manner according to an embodiment of the present invention. On the premise that the maximum bandwidth that can be supported by the terminal is 20 MHz, in different system bandwidths, a quantity of states that can be indicated by the first intermediate indicator value is enough to indicate resource allocation states when the RBG includes six consecutive RBs. For example, the system bandwidth is 15 MHz, and it may be determined, according to a calculation formula of the first intermediate indicator value, that a maximum quantity of available states of the first intermediate indicator value is 176. When one RBG includes six RBs, a quantity of resource allocation states that need to be considered in the first resource allocation manner is 120, and a specific quantity of allocated consecutive RBGs is 2 to 16. In different system bandwidths, resource allocation may be indicated by using a method similar to the method used when the system bandwidth is 20 MHz. A mark "N/A" indicates that for a corresponding system bandwidth and a corresponding quantity of RBs included in one RBG, the first intermediate indicator value cannot be used for allocation, and the corresponding maximum quantity of available states of the first intermediate indicator value is exceeded.

TABLE 3

| System Bandwidth | Maximum Quantity of Available States of the First Intermediate Indicator Value | Quantity of Resource Allocation States When RBG = 6 RB | Quantity of Resource Allocation States When RBG = 3 RB | Quantity of Resource Allocation States When RBG = 2 RB |
| --- | --- | --- | --- | --- |
| 20 MHz | 176 | (2 to 16 RBGs) 120 | N/A | N/A |
| 15 MHz | 176 | (2 to 12 RBGs) 66 | N/A | N/A |
| 10 MHz | 88 | (2 to 8 RBGs) 28 | N/A | N/A |
| 5 MHz | 44 | (2 to 4 RBGs) 6 | (3 to 8 RBGs) 21 | N/A |
| 3 MHz | 22 | (2 RBGs) 1 | (3 to 4 RBGs) 3 | (4 to 6 RBGs) 6 |

Referring to Table 4, Table 4 is a table of another possible resource allocation situation in the first resource allocation manner according to an embodiment of the present invention. On the premise that the maximum bandwidth that can be supported by the terminal is 5 MHz, in different system bandwidths, a quantity of states that can be indicated by the first intermediate indicator value is enough to indicate resource allocation states when the RBG includes three consecutive RBs. Therefore, in different system bandwidths, resource allocation may be indicated by using a method similar to the method used when the system bandwidth is 20 MHz. For a corresponding description of information included in the table, refer to the specific description in Table 3. The rest can be deduced by analogy, and details are not described herein again.

TABLE 4

| System Bandwidth | Maximum Quantity of Available States of the First Intermediate Indicator Value | Quantity of Resource Allocation States When RBG = 6 RB | Quantity of Resource Allocation States When RBG = 3 RB | Quantity of Resource Allocation States When RBG = 2 RB |
| --- | --- | --- | --- | --- |
| 20 MHz | 176 | (2 to 4 RBGs) 42 | (3 to 8 RBGs) 165 | N/A |
| 15 MHz | 176 | (2 to 4 RBGs) 30 | (3 to 8 RBGs) 117 | N/A |
| 10 MHz | 88 | (2 to 4 RBGs) 18 | (3 to 8 RBGs) 69 | N/A |
| 5 MHz | 44 | (2 to 4 RBGs) 6 | (3 to 8 RBGs) 21 | N/A |
| 3 MHz | 22 | (2 RBGs) 1 | (3 to 4 RBGs) 3 | (4 to 6 RBGs) 6 |

In another possible embodiment, the resource indication information includes a second field and a sixth field. Specifically, whether the transmission resource is allocated in the first resource allocation manner or the second resource allocation manner may be determined by using a bit state in the second field. In an optional scheme, the second field includes Z binary bits, and Z is a positive integer. Optionally, bit locations of the second field and the sixth field may be bit locations included in the existing DCI. In this way, the transmission resource greater than one NB can be allocated without increasing bit overheads, so as to enhance effective utilization of each bit in the DCI.

Figure 9:
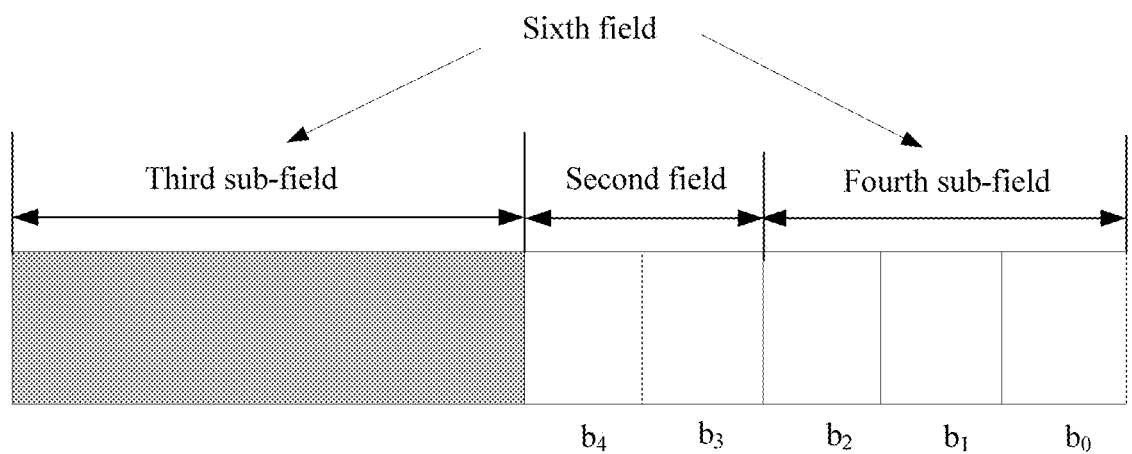
FIG. 9 is an example diagram of resource allocation in another DCI format according to an embodiment of the present invention.

For example, referring to FIG. 9, FIG. 9 is an example diagram of resource allocation in a DCI format according to an embodiment of the present invention. It can be learned that a quantity of binary bits of the second field is 2, and two most significant bits in the last five bits in the existing technical solution are selected, that is, $b_4b_3$. In the existing technical solution, 21 bit states are used for the second resource allocation manner, and 21 states of $b_4b_3b_2b_1b_0$ from '00000' to '10100' are used. Therefore, allocation states of '10101' to '11111' cannot occur, that is, a state of '11xxx' cannot occur. Therefore, whether the transmission resource is allocated in the first resource allocation manner or the second resource allocation manner may be determined by using $b_4b_3$. If states of bit locations of $b_4b_3$ are both 1, it is determined that the transmission resource is allocated in the first resource allocation manner. If at least one of the states of the bit locations of $b_4b_3$ is 0, it is determined that the transmission resource is allocated in the second resource allocation manner. Herein is merely an example for description. Bit state division of $b_4b_3$ is not limited in this embodiment of the present invention.

Further, optionally, for the remaining $b_2b_1b_0$ in the last five bits and $$\left[\log_2\left\lfloor\frac{N_{RB}^{UL}}{6}\right\rfloor\right]\left(\left[\log_2\left\lfloor\frac{N_{RB}^{DL}}{6}\right\rfloor\right]\right.$$

in downlink) bits in the existing DCI, referring to FIG. 9, the sixth field includes a third sub-field and a fourth sub-field, the fourth sub-field includes bits $b_2b_1b_0$, and the third sub-field includes $$\left[\log_2\left\lfloor\frac{N_{RB}^{UL}}{6}\right\rfloor\right]\left(\left[\log_2\left\lfloor\frac{N_{RB}^{DL}}{6}\right\rfloor\right]\right.$$

in downlink) bits. When the allocated transmission resource is determined based on the second resource allocation manner and the resource indication information, the existing technical solution may be used, that is, an NB index of an NB may be determined based on the third sub-field, and a resource indicator value may be determined based on a binary number of $b_4b_3b_2b_1b_0$, so as to determine the allocated transmission resource. When the allocated transmission resource is determined based on the first resource allocation manner and the resource indication information, in an optional scheme, a third intermediate indicator value is calculated according to a third calculation formula and the third sub-field and the fourth sub-field that are included in the sixth field, and a resource indicator value corresponding to the third intermediate indicator value is determined based on a preset third mapping relationship.

Optionally, the third calculation formula is $X_{3=8}*M_3+N_3$, where $M_3$ represents a decimal number corresponding to a binary value of the third sub-field, $N_3$ represents a decimal number corresponding to a binary value of the fourth sub-field, and $X_3$ represents the third intermediate indicator value. Because there are only eight bit states in $b_2b_1b_0$ in the first resource allocation manner when $b_4b_3$ is 11, there are eight possibilities for each bit state of the third sub-field. Therefore, the third intermediate indicator value calculated in this manner can reflect all bit states included in the third sub-field and the fourth sub-field, a minimum value of the third intermediate indicator value may be 0, and the third intermediate indicator value may range between consecutive integers. The third calculation formula herein is an optional formula, and the third calculation formula is not limited in this embodiment of the present invention.

In actual application, a system bandwidth may be 20 MHz, 15 MHz, 10 MHz, 5 MHz, 3 MHz, or the like, and a maximum bandwidth that can be supported by the terminal may be 20 MHz, 5 MH, or the like. For different system bandwidths of the base station and different maximum bandwidths that can be supported by the terminal, different third mapping relationships between different third intermediate indicator values and different resource indicator values may be set, to implement a one-to-one correspondence between the third intermediate indicator values and the resource indicator values.

For example, if the system bandwidth is 20 MHz, and the maximum bandwidth that can be supported by the terminal is 20 MHz (20 MHz is corresponding to 16 NBs, one NB includes six RBs, and therefore there are totally 96 RBs), one RBG is set to include six consecutive RBs. For details, refer to the detailed descriptions of FIG. 7a and FIG. 7b. The quantity of resource allocation states in the first resource allocation manner is 120. Because the system bandwidth is 20 MHz, a quantity of binary bits included in the third sub-field is 4, and the third intermediate indicator value determined according to the third calculation formula includes 128 states. Therefore, a value range of the third intermediate indicator value is enough to support 120 possibilities. Optionally, the third intermediate indicator value ranges from 0 to 119 (including 0 and 119).

Further, if the system bandwidth is 20 MHz, and the maximum bandwidth that can be supported by the terminal is 20 MHz, optionally, the preset third mapping relationship may be $RIV=X_1+16$. The third mapping relationship needs to ensure that the third intermediate indicator values are in a one-to-one correspondence with the RIVs, and the third mapping relationship is not limited in this embodiment of the present invention.

The one-to-one correspondence between the resource indicator values and the third intermediate indicator values may be established by using the foregoing method. After determining to allocate the transmission resource to the terminal, and determining that the resource allocation manner is the first resource allocation manner, the base station determines, based on the to-be-allocated transmission resource, the bit states corresponding to the second field and the sixth field in the DCI. The terminal receives the DCI, determines the first resource allocation manner based on the second field, obtains the third intermediate indicator value through calculation based on the bit state corresponding to the sixth field, determines, based on the third mapping relationship, the RIV corresponding to the third intermediate indicator value, and determines, based on the RIV, the start RBG for resource allocation and the quantity of consecutive RBGs starting from the start RBG, so as to determine the transmission resource allocated by the base station.

For another example, if the system bandwidth is 20 MHz, and the maximum bandwidth that can be supported by the terminal is 5 MHz (5 MHz is corresponding to eight NBs, and there are totally 24 RBs), one RBG is set to include three consecutive RBs. In this case, in the first resource allocation manner, only a scenario in which three RBGs, four RBGs, . . . , or eight RBGs are allocated needs to be considered. Further, if only an even-numbered RBG is allowed to serve as a starting point for resource allocation (an odd-numbered RBG such as an RBG 1 or an RBG 3 cannot be used as a starting point, and an odd number and an even number herein are a preset index number of an RBG), the quantity of resource allocation states in the first resource allocation manner is 84 (15+15+14+14+13+13). Because the system bandwidth is 20 MHz, a quantity of binary bits included in the third sub-field is 4, and the third intermediate indicator value determined according to the third calculation formula includes 128 states. Therefore, a value range of the third intermediate indicator value is enough to support 84 possibilities. Optionally, the third intermediate indicator value ranges from 0 to 83 (including 0 and 83).

Further, if the system bandwidth is 20 MHz, and the maximum bandwidth that can be supported by the terminal is 5 MHz, optionally, the preset third mapping relationship may be:

$$i_3 = \left\lfloor \frac{X_3}{28} \right\rfloor$$

$$j_3 = \left\lfloor \frac{X_3 - 28 * i_3}{15 - \left\lfloor \frac{i_3}{2} \right\rfloor} \right\rfloor * (5 - 2 * i_3) + i_3$$

$$RIV = 2 * \left( X_3 - \left\lfloor \frac{X_3 - 28 * i_3}{15 - \left\lfloor \frac{i_3}{2} \right\rfloor} \right\rfloor * \left( 15 - \left\lfloor \frac{1}{2} \right\rfloor \right) - 28 * i_3 \right) + 32 * (2 + j_3), \text{ where}$$

$i_3$ represents a parameter calculated based on the third intermediate indicator value $X_3$, $j_3$ represents a parameter calculated based on the third intermediate indicator value $X_3$, and RIV represents the resource indicator value. $i_3$ and $j_3$ are integer intermediate variables, as shown in Table 5. It can be learned that by using the foregoing formula, $i_3$ and $j_3$ may be corresponding to a quantity of consecutive RBGs, and the third intermediate indicator values may be in a one-to-one correspondence with the resource indicator values.

TABLE 5

| Quantity of Consecutive RBGs | Quantity of States | $i_3$ | $j_3$ | $X_3$ | RIV |
|---|---|---|---|---|---|
| 3 | 15 | 0 | 0 | 0 to 14 | 64, 66, . . . , 90, 92 |
| 8 | 13 |   | 5 | 15 to 27 | 224, 226, . . . , 246, 248 |
| 4 | 15 | 1 | 1 | 28 to 42 | 96, 98, . . . , 122, 124 |
| 7 | 13 |   | 4 | 43 to 55 | 192, 194, . . . , 214, 216 |
| 5 | 14 | 2 | 2 | 56 to 69 | 128, 130, . . . , 152, 154 |
| 6 | 14 |   | 3 | 70 to 83 | 160, 162, . . . , 184, 186 |

If the system bandwidth is 20 MHz, and the maximum bandwidth that can be supported by the terminal is 5 MHz, optionally, the preset third mapping relationship may be:

$RIV=X_3+\text{Offset}(X_3)$, where

RIV represents the resource indicator value, and Offset ($X_3$) represents a predefined offset of the resource indicator value RIV relative to the third intermediate indicator value Optionally, because the third intermediate indicator value ranges from 0 to 83, in an optional scheme, an offset may be specified for third intermediate indicator values in different ranges, and it is ensured that the third intermediate indicator values are in a one-to-one correspondence with the RIVs. An offset indicated by a third intermediate indicator value in each range is not limited in this embodiment of the present invention. For example, referring to Table 6, Table 6 provides a possible correspondence between a third intermediate indicator value and an RIV.

TABLE 6

| Quantity of Consecutive RBGs | Quantity of States | $X_3$ | RIV | Offset($X_3$) |
|---|---|---|---|---|
| 3 | 15 | 0 to 14 | 64, 66, . . . , 90, 92 | 64 |
| 4 | 15 | 15 to 29 | 96, 98, . . . , 122, 124 | 66 |
| 5 | 14 | 30 to 43 | 128, 130, . . . , 152, 154 | 68 |
| 6 | 14 | 44 to 57 | 160, 162, . . . , 184, 186 | 72 |
| 7 | 13 | 58 to 70 | 192, 194, . . . , 214, 216 | 76 |
| 8 | 13 | 71 to 83 | 224, 226, . . . , 246, 248 | 82 |

The one-to-one correspondence between the resource indicator values and the third intermediate indicator values may be established by using the foregoing method. After determining to allocate the transmission resource to the terminal, and determining that the resource allocation manner is the first resource allocation manner, the base station determines, based on the to-be-allocated transmission resource, the bit states corresponding to the second field and the sixth field in the DCI. The terminal receives the DCI, determines the first resource allocation manner based on the second field, obtains the third intermediate indicator value through calculation based on the bit state corresponding to the sixth field, determines, based on the third mapping relationship, the RIV corresponding to the third intermediate indicator value, and determines, based on the RIV, the start RBG for resource allocation and the quantity of consecutive RBGs starting from the start RBG, so as to determine the transmission resource allocated by the base station.

TABLE 7

| System Bandwidth | Maximum Quantity of Available States of the Third Intermediate Indicator Value | Quantity of Resource Allocation States When RBG = 6 RB | Quantity of Resource Allocation States When RBG = 3 RB | Quantity of Resource Allocation States When RBG = 2 RB |
|---|---|---|---|---|
| 20 MHz | 128 | (2 to 16 RBGs) 120 | N/A | N/A |
| 15 MHz | 128 | (2 to 12 RBGs) 66 | N/A | N/A |
| 10 MHz | 64 | (2 to 8 RBGs) 28 | N/A | N/A |
| 5 MHz | 32 | (2 to 4 RBGs) 6 | (3 to 8 RBGs) 21 | N/A |
| 3 MHz | 16 | (2 RBGs) 1 | (3 to 4 RBGs) 3 | (4 to 6 RBGs) 6 |

Further, for different system bandwidths, RBGs including different quantities of RBs, and different maximum bandwidths supported by the terminal, a maximum quantity of available states of the determined third intermediate indicator value is different, and a quantity of RBGs that can be allocated in the first resource allocation manner is different. Referring to Table 7, Table 7 is a table of a possible resource allocation situation in the first resource allocation manner according to an embodiment of the present invention. On the premise that the maximum bandwidth that can be supported by the terminal is 20 MHz, in different system bandwidths, a quantity of states that can be indicated by the third intermediate indicator value is enough to indicate resource allocation states when the RBG includes six consecutive RBs. For example, the system bandwidth is 10 MHz, and it may be determined, according to a calculation formula of the third intermediate indicator value, that a maximum quantity of available states of the third intermediate indicator value is 64. When one RBG includes six RBs, a quantity of resource allocation states that need to be considered in the first resource allocation manner is 128, and a specific quantity of allocated consecutive RBGs is 2 to 8. In different system bandwidths, resource allocation may be indicated by using a method similar to the method used when the system bandwidth is 20 MHz. A mark "N/A" indicates that for a corresponding system bandwidth and a corresponding quantity of RBs included in one RBG, the third intermediate indicator value cannot be used for allocation, and the corresponding maximum quantity of available states of the third intermediate indicator value is exceeded.

Referring to Table 8, Table 8 is a table of another possible resource allocation situation in the first resource allocation manner according to an embodiment of the present invention. On the premise that the maximum bandwidth that can be supported by the terminal is 5 MHz, in different system bandwidths, a quantity of states that can be indicated by the third intermediate indicator value is enough to indicate resource allocation states when the RBG includes six consecutive RBs. Therefore, in different system bandwidths, resource allocation may be indicated by using a method similar to the method used when the system bandwidth is 20 MHz. Alternatively, resource allocation in the system bandwidths of 20 MHz and 10 MHz may be limited (an index number of the included RBG starts from 0, and an index number of the start RBG for resource allocation is an even number). Alternatively, in different system bandwidths, the third intermediate indicator value may be used to indicate all possibilities of resource allocation when the RBG includes three consecutive RBs. Therefore, resource allocation may be indicated by using a method similar to the method used when the system bandwidth is 20 MHz. For example, the system bandwidth is 20 MHz, and it may be determined, according to a calculation formula of the third intermediate indicator value, that a maximum quantity of available states of the third intermediate indicator value is 128. When one RBG includes three RBs, a quantity of resource allocation states that need to be considered in the first resource allocation manner is 165, and a specific quantity of allocated consecutive RBGs is 3 to 8. Considering a further limitation that an index number of the included RBG starts from 0 and an index number of the start RBG for resource allocation is an even number, the quantity of resource allocation states that need to be considered in the first resource allocation manner is 84. Therefore, resource allocation may be still indicated by using a method similar to the method used when the system bandwidth is 20 MHz.

TABLE 8

| System Bandwidth | Maximum Quantity of Available States of the Third Intermediate Indicator Value | Quantity of Resource Allocation States When RBG = 6 RB | Quantity of Resource Allocation States When RBG = 3 RB | Quantity of Resource Allocation States When RBG = 2 RB |
|---|---|---|---|---|
| 20 MHz | 128 | (2 to 4 RBGs) 42 | (3 to 8 RBGs) 165 (84 after the limitation is set) | N/A |
| 15 MHz | 128 | (2 to 4 RBGs) 30 | (3 to 8 RBGs) 117 | N/A |
| 10 MHz | 64 | (2 to 4 RBGs) 18 | (3 to 8 RBGs) 69 (36 after the limitation is set) | N/A |

TABLE 8-continued

| System Bandwidth | Maximum Quantity of Available States of the Third Intermediate Indicator Value | Quantity of Resource Allocation States When RBG = 6 RB | Quantity of Resource Allocation States When RBG = 3 RB | Quantity of Resource Allocation States When RBG = 2 RB |
|---|---|---|---|---|
| 5 MHz | 32 | (2 to 4 RBGs) 6 | (3 to 8 RBGs) 21 | N/A |
| 3 MHz | 16 | (2 RBGs) 1 | (3 to 4 RBGs) 3 | (4 to 6 RBGs) 6 |

In another possible embodiment, the resource indication information includes a third field and a fifth field. Specifically, whether the transmission resource is allocated in the first resource allocation manner or the second resource allocation manner may be determined by using a bit state in the third field. In an optional scheme, the third field includes one binary bit. Optionally, compared with an existing DCI format, a bit location of the third field may be additionally added. In this way, the transmission resource greater than one NB can be allocated when one bit is added, so as to enhance effective utilization of each bit in the DCI.

Figure 10:
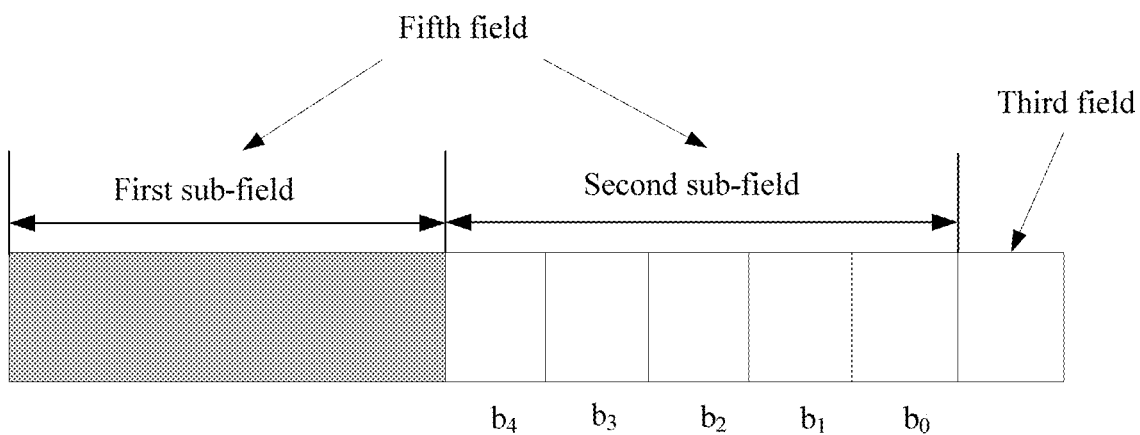
FIG. 10 is an example diagram of resource allocation in another DCI format according to an embodiment of the present invention.

For example, referring to FIG. 10, FIG. 10 is an example diagram of resource allocation in another DCI format according to an embodiment of the present invention. It can be learned that a quantity of binary bits of the third field is 1, and the last five bits and $$\left\lceil \log_2 \left\lfloor \frac{N_{RB}^{UL}}{6} \right\rfloor \right\rceil \left\lceil \log_2 \left\lfloor \frac{N_{RB}^{DL}}{6} \right\rfloor \right\rceil$$

(in downlink) bits in the existing technical solution are further included. If the bit state of the third field is 1, it is determined that the transmission resource is allocated in the first resource allocation manner; if the bit state of the third field is 0, it is determined that the transmission resource is allocated in the second resource allocation manner. Alternatively, if the bit state of the third field is 0, it is determined that the transmission resource is allocated in the first resource allocation manner; if the bit state of the third field is 1, it is determined that the transmission resource is allocated in the second resource allocation manner. This is not limited in this embodiment of the present invention.

Further, optionally, for the last five bits $b_4 b_3 b_2 b_1 b_0$ and $$\left\lceil \log_2 \left\lfloor \frac{N_{RB}^{UL}}{6} \right\rfloor \right\rceil \left\lceil \log_2 \left\lfloor \frac{N_{RB}^{DL}}{6} \right\rfloor \right\rceil$$

in downlink) bits in the existing DCI, referring to FIG. 10, the fifth field includes a first sub-field and a second sub-field, the second sub-field includes the bits $b_4 b_3 b_2 b_1 b_0$, and the first sub-field includes $$\left\lceil \log_2 \left\lfloor \frac{N_{RB}^{UL}}{6} \right\rfloor \right\rceil \left\lceil \log_2 \left\lfloor \frac{N_{RB}^{DL}}{6} \right\rfloor \right\rceil$$

in downlink) bits. When the allocated transmission resource is determined based on the second resource allocation manner and the resource indication information, the existing technical solution may be used, that is, an NB index of an NB may be determined based on the first sub-field, and a resource indicator value may be determined based on a binary number of $b_4 b_3 b_2 b_1 b_0$, so as to determine the allocated transmission resource. When the allocated transmission resource is determined based on the first resource allocation manner and the resource indication information, in an optional scheme, a second intermediate indicator value is calculated according to a second calculation formula and the first sub-field and the second sub-field that are included in the fifth field, and a resource indicator value corresponding to the second intermediate indicator value is determined based on a preset second mapping relationship.

Optionally, the second calculation formula is:

$X_2 = 32 * M_2 + N_2$, where $M_2$ represents a decimal number corresponding to a binary value of the first sub-field, $N_2$ represents a decimal number corresponding to a binary value of the second sub-field, and $X_2$ represents the second intermediate indicator value. Because there are totally 32 bit states in $b_4 b_3 b_2 b_1 b_0$ in the first resource allocation manner, there are 32 possibilities for each bit state of the first sub-field. Therefore, the second intermediate indicator value calculated in this manner can reflect all bit states included in the first sub-field and the second sub-field, a minimum value of the second intermediate indicator value may be 0, and the second intermediate indicator value may range between consecutive integers. The second calculation formula herein is an optional formula, and the second calculation formula is not limited in this embodiment of the present invention.

In actual application, a system bandwidth may be 20 MHz, 15 MHz, 10 MHz, 5 MHz, 3 MHz, or the like, and a maximum bandwidth that can be supported by the terminal may be 20 MHz, 5 MH, or the like. For different system bandwidths of the base station and different maximum bandwidths that can be supported by the terminal, different second mapping relationships between different second intermediate indicator values and different resource indicator values may be set, to implement a one-to-one correspondence between the second intermediate indicator values and the resource indicator values.

For example, if the system bandwidth is 20 MHz, and the maximum bandwidth that can be supported by the terminal is 20 MHz (20 MHz is corresponding to 16 NBs, one NB includes six RBs, and therefore there are totally 96 RBs), one RBG is set to include three consecutive RBs. In this case, in the first resource allocation manner, a scenario in which three RBGs, four RBGs, . . . , or 32 RBGs are allocated needs to be considered, and there are totally 465 (30+29+ . . . +1) states. The quantity of resource allocation states in the first resource allocation manner is 465. Because the system bandwidth is 20 MHz, a quantity of binary bits included in the first sub-field is 4, and the second intermediate indicator value determined according to the second calculation formula includes 512 states. Therefore, a value range of the second intermediate indicator value is enough to support 465 possibilities. Optionally, the second intermediate indicator value ranges from 0 to 464 (including 0 and 464).

Further, if the system bandwidth is 20 MHz, and the maximum bandwidth that can be supported by the terminal is 20 MHz, optionally, the preset second mapping relationship may be $RIV = X_2 + 63$. The second mapping relationship needs to ensure that the second intermediate indicator values are in a one-to-one correspondence with the RIVs, and the second mapping relationship is not limited in this embodiment of the present invention.

The one-to-one correspondence between the resource indicator values and the second intermediate indicator values may be established by using the foregoing method. After determining to allocate the transmission resource to the terminal, and determining that the resource allocation manner is the first resource allocation manner, the base station determines, based on the to-be-allocated transmission resource, the bit states corresponding to the third field and the fifth field in the DCI. The terminal receives the DCI, determines the first resource allocation manner based on the third field, obtains the second intermediate indicator value through calculation based on the bit state corresponding to the fifth field, determines, based on the second mapping relationship, the RIV corresponding to the second intermediate indicator value, and determines, based on the RIV, the start RBG for resource allocation and the quantity of consecutive RBGs starting from the start RBG, so as to determine the transmission resource allocated by the base station.

For another example, if the system bandwidth is 20 MHz, and the maximum bandwidth that can be supported by the terminal is 5 MHz (5 MHz is corresponding to eight NBs, and there are totally 24 RBs), one RBG is set to include two consecutive RBs. In this case, in the first resource allocation manner, only a scenario in which four RBGs, five RBGs, . . . , or 12 RBGs are allocated needs to be considered. The quantity of resource allocation states in the first resource allocation manner is 369 (45+44+ . . . +37). Because the system bandwidth is 20 MHz, a quantity of binary bits included in the first sub-field is 4, and the second intermediate indicator value determined according to the second calculation formula includes 512 states. Therefore, a value range of the second intermediate indicator value is enough to support 369 possibilities. Optionally, the second intermediate indicator value ranges from 0 to 368 (including 0 and 368).

Further, if the system bandwidth is 20 MHz, and the maximum bandwidth that can be supported by the terminal is 5 MHz, optionally, the preset second mapping relationship may be:

$$i_2 = \left\lfloor \frac{X_2}{82} \right\rfloor$$

$$j_2 = \left\lfloor \frac{X_2 - 82*i_2}{45 - i} \right\rfloor * (8 - 2*i_2) + i_2$$

$$RIV = X_2 - \left\lfloor \frac{X_2 - 82*i_2}{45 - i_2} \right\rfloor * (45 - i_2) - 82*i_2 + 48*(3 + j_2), \text{ where}$$

where $i_2$ represents a parameter calculated based on the second intermediate indicator value $X_2$, $j_2$ represents a parameter calculated based on the second intermediate indicator value $X_2$, and RIV represents the resource indicator value. $i_2$ and $j_2$ are integer intermediate variables, as shown in Table 9. It can be learned that by using the foregoing formula, $i_2$ and $j_2$ may be corresponding to a quantity of consecutive RBGs, and the second intermediate indicator values may be in a one-to-one correspondence with the resource indicator values.

TABLE 9

| Quantity of Consecutive RBGs | Quantity of States | $i_2$ | $j_2$ | $X_2$ | RIV |
|---|---|---|---|---|---|
| 4 | 45 | 0 | 0 | 0 to 44 | 144 to 188 |
| 12 | 37 | | 8 | 45 to 81 | 528 to 564 |

TABLE 9-continued

| Quantity of Consecutive RBGs | Quantity of States | $i_2$ | $j_2$ | $X_2$ | RIV |
|---|---|---|---|---|---|
| 5 | 44 | 1 | 1 | 82 to 125 | 192 to 235 |
| 11 | 38 | | 7 | 126 to 163 | 480 to 517 |
| 6 | 43 | 2 | 2 | 164 to 206 | 240 to 282 |
| 10 | 39 | | 6 | 207 to 245 | 432 to 470 |
| 7 | 42 | 3 | 3 | 246 to 287 | 288 to 329 |
| 9 | 40 | | 5 | 288 to 327 | 384 to 423 |
| 8 | 41 | 4 | 4 | 328 to 368 | 336 to 376 |

If the system bandwidth is 20 MHz, and the maximum bandwidth that can be supported by the terminal is 5 MHz, optionally, the preset second mapping relationship may be:

$RIV = X_2 + \text{Offset}(X_2)$, where

RIV represents the resource indicator value, and Offset ($X_2$) represents a predefined offset of the resource indicator value RIV relative to the second intermediate indicator value $X_2$. Optionally, because the second intermediate indicator value ranges from 0 to 369, in an optional scheme, an offset may be specified for second intermediate indicator values in different ranges, and it is ensured that the second intermediate indicator values are in a one-to-one correspondence with the RIVs. An offset indicated by a second intermediate indicator value in each range is not limited in this embodiment of the present invention. For example, referring to Table 10, Table 10 provides a possible correspondence between a second intermediate indicator value and an RIV.

TABLE 10

| Quantity of Consecutive RBGs | Quantity of States | $X_2$ | RIV | Offset($X_2$) |
|---|---|---|---|---|
| 4 | 45 | 0 to 44 | 144 to 188 | 144 |
| 5 | 44 | 45 to 88 | 192 to 235 | 147 |
| 6 | 43 | 89 to 131 | 240 to 282 | 151 |
| 7 | 42 | 132 to 173 | 288 to 329 | 156 |
| 8 | 41 | 174 to 214 | 336 to 376 | 162 |
| 9 | 40 | 215 to 254 | 384 to 423 | 169 |
| 10 | 39 | 255 to 293 | 432 to 470 | 177 |
| 11 | 38 | 294 to 331 | 480 to 517 | 186 |
| 12 | 37 | 332 to 368 | 528 to 564 | 196 |

The one-to-one correspondence between the resource indicator values and the second intermediate indicator values may be established by using the foregoing method. After determining to allocate the transmission resource to the terminal, and determining that the resource allocation manner is the first resource allocation manner, the base station determines, based on the to-be-allocated transmission resource, the bit states corresponding to the third field and the fifth field in the DCI. The terminal receives the DCI, determines the first resource allocation manner based on the third field, obtains the second intermediate indicator value through calculation based on the bit state corresponding to the fifth field, determines, based on the second mapping relationship, the RIV corresponding to the second intermediate indicator value, and determines, based on the RIV, the start RBG for resource allocation and the quantity of consecutive RBGs starting from the start RBG, so as to determine the transmission resource allocated by the base station.

Further, for different system bandwidths, RBGs including different quantities of RBs, and different maximum bandwidths supported by the terminal, a maximum quantity of available states of the determined second intermediate indicator value is different, and a quantity of RBGs that can be allocated in the first resource allocation manner is different.

Referring to Table 11, Table 11 is a table of a possible resource allocation situation in the first resource allocation manner according to an embodiment of the present invention. On the premise that the maximum bandwidth that can be supported by the terminal is 20 MHz, in different system bandwidths, a quantity of states that can be indicated by the second intermediate indicator value is enough to indicate resource allocation states when the RBG includes three consecutive RBs. Therefore, in different system bandwidths, resource allocation may be indicated by using a method similar to the method used when the system bandwidth is 20 MHz.

TABLE 11

| System Bandwidth | Maximum Quantity of Available States of the Second Intermediate Indicator Value | Quantity of Resource Allocation States When RBG = 6 RB | Quantity of Resource Allocation States When RBG = 3 RB | Quantity of Resource Allocation States When RBG = 2 RB |
|---|---|---|---|---|
| 20 MHz | 512 | (2 to 16 RBGs) 120 | (3 to 32 RBGs) 465 | N/A |
| 15 MHz | 512 | (2 to 12 RBGs) 66 | (3 to 24 RBGs) 253 | N/A |
| 10 MHz | 256 | (2 to 8 RBGs) 28 | (3 to 16 RBGs) 105 | (4 to 24 RBGs) 231 |
| 5 MHz | 128 | (2 to 4 RBGs) 6 | (3 to 8 RBGs) 21 | (4 to 12 RBGs) 45 |
| 3 MHz | 64 | (2 RBGs) 1 | (3 to 4 RBGs) 3 | (4 to 6 RBGs) 6 |

Referring to Table 12, Table 12 is a table of another possible resource allocation situation in the first resource allocation manner according to an embodiment of the present invention. On the premise that the maximum bandwidth that can be supported by the terminal is 5 MHz, in different system bandwidths, a quantity of states that can be indicated by the second intermediate indicator value is enough to indicate resource allocation states when the RBG includes two consecutive RBs. Therefore, in different system bandwidths, resource allocation may be indicated by using a method similar to the method used when the system bandwidth is 20 MHz.

TABLE 12

| System Bandwidth | Maximum Quantity of Available States of the Second Intermediate Indicator Value | Quantity of Resource Allocation States When RBG = 6 RB | Quantity of Resource Allocation States When RBG = 3 RB | Quantity of Resource Allocation States When RBG = 2 RB |
|---|---|---|---|---|
| 20 MHz | 512 | (2 to 4 RBGs) 42 | (3 to 8 RBGs) 165 | (4 to 12 RBGs) 369 |
| 15 MHz | 512 | (2 to 4 RBGs) 30 | (3 to 8 RBGs) 117 | (4 to 12 RBGs) 261 |
| 10 MHz | 256 | (2 to 4 RBGs) 18 | (3 to 8 RBGs) 69 | (4 to 12 RBGs) 153 |
| 5 MHz | 128 | (2 to 4 RBGs) 6 | (3 to 8 RBGs) 21 | (4 to 12 RBGs) 45 |
| 3 MHz | 64 | (2 RBGs) 1 | (3 to 4 RBGs) 3 | (4 to 6 RBGs) 6 |

Further, a case in which the terminal interprets, after receiving the DCI, the DCI to determine the allocated transmission resource is described above in detail. In step 201, determining the DCI by the base station may be determining the resource allocation manner, the field in the DCI, and content in the field based on a reverse process of interpreting the DCI by the terminal. Specifically, first, the base station determines, based on a current resource requirement and the maximum bandwidth that can be supported by the terminal, the transmission resource allocated to the terminal, that is, determines the allocated start RBG and the quantity of consecutive RBGs starting from the start RBG. Then, the base station determines the resource indicator value of the allocated transmission resource, for example, may search a correspondence between the RIV and the start RBG and the quantity of consecutive RBGs starting from the start RBG for the RIV corresponding to the allocated transmission resource. Finally, the base station determines the resource indication information in the DCI based on the RIV, and sends the DCI including the resource indication information to the terminal.

It should be noted that determining the resource indication information in the DCI by the base station based on the RIV may be a reverse process of determining the RIV by the terminal based on the resource indication information. For example, when the resource indication information includes the first field and the fourth field, if the base station allocates the transmission resource greater than one NB to the terminal, the base station determines the first intermediate indicator value based on the RIV, and determines binary values of the first field and the fourth field based on the first intermediate indicator value, that is, determines the resource indicator value. Herein is an example for description. In this embodiment of the present invention, the base station may determine the resource indication information based on the RIV according to a reverse process of determining the RIV by the terminal in another manner. This is not limited in this embodiment of the present invention.

In this embodiment of the present invention, the terminal receives, from the base station, the DCI including the resource indication information, and determines, based on the resource indication information, the first resource allocation manner used to allocate the transmission resource greater than one narrowband (NB) and the second resource allocation manner used to allocate the transmission resource less than or equal to one NB. The terminal determines the allocated transmission resource based on the determined transmission resource allocation manner and the resource indication information, and transmits the data by using the allocated transmission resource. In this way, the transmission resource greater than one NB and the transmission resource less than or equal to one NB can be allocated, improving flexibility of transmission resource allocation.

Figure 11:
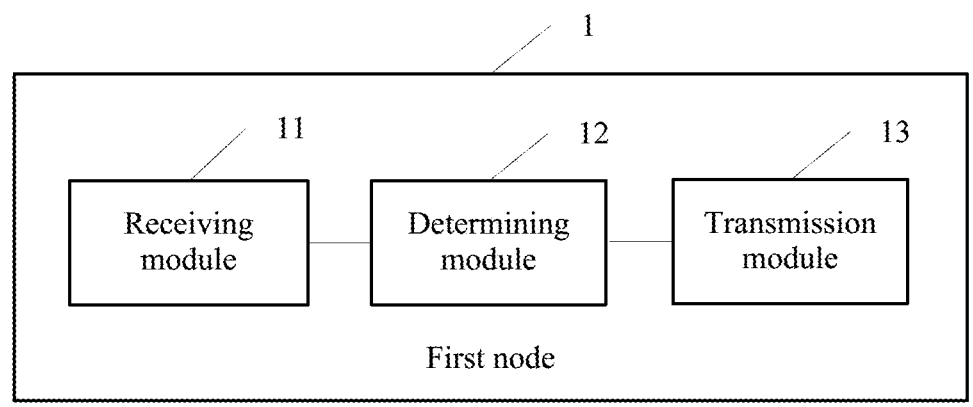
FIG. 11 is a schematic structural diagram of a first node according to an embodiment of the present invention.

FIG. 11 is a schematic structural diagram of a first node according to an embodiment of the present invention. The first node in this embodiment of the present invention may be the first node provided in any one of the embodiments shown in FIG. 4 to FIG. 10. As shown in FIG. 11, a first node 1 in this embodiment of the present invention may include a receiving module 11, a determining module 12, and a transmission module 13.

The receiving module 11 is configured to receive downlink control information (DCI) from a second node, where the DCI includes resource indication information, and the resource indication information is used to indicate a transmission resource allocation manner.

The determining module 12 is configured to determine a first resource allocation manner based on the resource indication information, where the first resource allocation manner is used to allocate a transmission resource greater than one narrowband (NB).

The determining module 12 is further configured to determine an allocated transmission resource based on the first resource allocation manner and the resource indication information.

The transmission module 13 is configured to transmit data by using the allocated transmission resource.

In an optional embodiment, the resource indication information includes a first field; and that the determining module is configured to determine a first resource allocation manner based on the resource indication information is specifically: when a value of the first field belongs to a first state set, determining the first resource allocation manner.

Further, optionally, a quantity of binary bits of the first field is 5; and the first state set includes a 5-bit binary value corresponding to a positive integer within an interval range [21, 31].

Further, optionally, a system bandwidth of the second node includes a plurality of resource block groups (RBGs), and each RBG includes at least one RB; and that the determining module 12 is configured to determine an allocated transmission resource based on the first resource allocation manner and the resource indication information is specifically: when the resource indication information includes the first field, and the resource indication information further includes a fourth field, determining a resource indicator value based on the first field and the fourth field; and searching for one or more target RBGs corresponding to the resource indicator value.

Further, optionally, the determining a resource indicator value based on the first field and the fourth field is specifically: calculating a first intermediate indicator value based on the first field and the fourth field by using a first calculation formula; and determining, based on a preset first mapping relationship, a resource indicator value corresponding to the first intermediate indicator value, where the first calculation formula is:

$X_1 = 11 * M_1 + (N_1 - 21)$, where $M_1$ represents a decimal number corresponding to a binary value of the fourth field, $N_1$ represents a decimal number corresponding to a binary value of the first field, and $X_1$ represents the first intermediate indicator value.

Further, optionally, the system bandwidth of the second node includes 96 RBs, a maximum bandwidth supported by the first node is 96 RBs, each RBG includes six RBs, and the first mapping relationship is:

$RIV = X_1 + 16$, where

RIV represents the resource indicator value.

Further, optionally, the system bandwidth of the second node includes 96 RBs, a maximum bandwidth supported by the first node is 24 RBs, each RBG includes three RBs, and the first mapping relationship is:

$$i_1 = \left\lfloor \frac{X_1}{55} \right\rfloor$$

$$j_1 = \left\lfloor \frac{X_1 - 55 * i_1}{30 - i} \right\rfloor * (5 - 2 * i_1) + i_1$$

$$RIV = X_1 - \left\lfloor \frac{X_1 - 55 * i_1}{30 - i} \right\rfloor * (30 - i_1) - 55 * i_1 + 32 * (2 + j_1), \text{ where}$$

$i_1$ represents a parameter calculated based on the first intermediate indicator value $X_1$, $j_1$ represents a parameter calculated based on the first intermediate indicator value $X_1$, and RIV represents the resource indicator value; or $RIV = X_1 + \text{Offset}(X_1)$, where RIV represents the resource indicator value, and Offset $(X_1)$ represents a predefined offset of the resource indicator value RIV relative to the first intermediate indicator value $X_1$.

In an optional embodiment, the resource indication information includes a second field including Z binary bits, and Z is a positive integer; and that the determining module 12 is configured to determine a first resource allocation manner based on the resource indication information is specifically: when each bit in the Z bits of the second field is 1, determining the first resource allocation manner.

Further, optionally, a quantity of binary bits of the second field is 2.

Further, optionally, a system bandwidth of the second node includes a plurality of resource block groups (RBGs), and each RBG includes at least one RB; and that the determining module 12 is configured to determine an allocated transmission resource based on the first resource allocation manner and the resource indication information is specifically: when the resource indication information includes the second field including the Z bits, and the resource indication information further includes a sixth field, determining a resource indicator value based on the sixth field; and searching for one or more target RBGs corresponding to the resource indicator value.

Further, optionally, the sixth field includes a third sub-field and a fourth sub-field, and the determining a resource indicator value based on the sixth field is specifically: calculating a third intermediate indicator value based on the third sub-field and the fourth sub-field by using a third calculation formula; and determining, based on a preset third mapping relationship, a resource indicator value corresponding to the third intermediate indicator value, where the third calculation formula is:

$X_3 = 8 * M_3 + N_3$, where $M_3$ represents a decimal number corresponding to a binary value of the third sub-field, $N_3$ represents a decimal number corresponding to a binary value of the fourth sub-field, and $X_3$ represents the third intermediate indicator value.

Further, optionally, the system bandwidth of the second node includes 96 RBs, a maximum bandwidth supported by the first node is 96 RBs, each RBG includes six RBs, and the third mapping relationship is:

$RIV = X_3 + 16$, where

RIV represents the resource indicator value.

Further, optionally, the system bandwidth of the second node includes 96 RBs, a maximum bandwidth supported by the first node is 24 RBs, each RBG includes three RBs, and the third mapping relationship is:

$$i_3 = \left\lfloor \frac{X_3}{28} \right\rfloor$$

$$j_3 = \left\lfloor \frac{X_3 - 28 * i_3}{15 - \left\lfloor \frac{i}{2} \right\rfloor} \right\rfloor * (5 - 2 * i_3) + i_3$$

$$RIV = 2 * \left( X_3 - \left\lfloor \frac{X_3 - 28 * i_3}{15 - \left\lfloor \frac{i_3}{2} \right\rfloor} \right\rfloor * \left(15 - \left\lfloor \frac{1}{2} \right\rfloor \right) - 28 * i_3 \right) + 32 * (2 + j_3), \text{ where}$$

$i_3$ represents a parameter calculated based on the third intermediate indicator value $X_3$, $j_3$ represents a parameter calculated based on the third intermediate indicator value $X_3$, and RIV represents the resource indicator value; or $$RIV=X_3+\text{Offset}(X_3), \text{ where}$$

RIV represents the resource indicator value, and Offset $(X_3)$ represents a predefined offset of the resource indicator value RIV relative to the third intermediate indicator value $X_3$.

In an optional embodiment, the resource indication information includes a third field; and that the determining module 12 is configured to determine a first resource allocation manner based on the resource indication information is specifically: when the third field is a first preset value, determining the first resource allocation manner.

Further, optionally, a quantity of binary bits of the third field is 1.

Further, optionally, a system bandwidth of the second node includes a plurality of resource block groups (RBGs), and each RBG includes at least one RB; and that the determining module 12 is configured to determine an allocated transmission resource based on the first resource allocation manner and the resource indication information is specifically: when the resource indication information includes the third field, and the resource indication information further includes a fifth field, determining a resource indicator value based on the fifth field; and searching for one or more target RBGs corresponding to the resource indicator value.

Further, optionally, the fifth field includes a first sub-field and a second sub-field, and the determining a resource indicator value based on the fifth field is specifically: calculating a second intermediate indicator value based on the first sub-field and the second sub-field by using a second calculation formula; and determining based on a preset second mapping relationship, a resource indicator value corresponding to the second intermediate indicator value, where the second calculation formula is:

$$X_2=32*M_2+N_2, \text{ where}$$

$M_2$ represents a decimal number corresponding to a binary value of the first sub-field, $N_2$ represents a decimal number corresponding to a binary value of the second sub-field, and $X_2$ represents the second intermediate indicator value.

Further, optionally, the system bandwidth of the second node includes 96 RBs, a maximum bandwidth supported by the first node is 96 RBs, each RBG includes three RBs, and the second mapping relationship is:

$$RIV=X_2+63, \text{ where}$$

RIV represents the resource indicator value.

Further, optionally, the system bandwidth of the second node includes 96 RBs, a maximum bandwidth supported by the first node is 24 RBs, each RBG includes two RBs, and the second mapping relationship is:

$$i_2 = \left\lfloor \frac{X_2}{82} \right\rfloor$$

$$j_2 = \left\lfloor \frac{X_2 - 82*i_2}{45-i} \right\rfloor * (8 - 2*i_2) + i_2$$

$$RIV = X_2 - \left\lfloor \frac{X_2 - 82*i_2}{45-i_2} \right\rfloor * (45 - i_2) - 82*i_2 + 48*(3 + j_2), \text{ where}$$

$i_2$ represents a parameter calculated based on the second intermediate indicator value $X_2$, $j_2$ represents a parameter calculated based on the second intermediate indicator value $X_2$, and RIV represents the resource indicator value; or $$RIV=X_2+\text{Offset}(X_2), \text{ where}$$

RIV represents the resource indicator value, and Offset $(X_2)$ represents a predefined offset of the resource indicator value RIV relative to the second intermediate indicator value $X_2$.

In an optional embodiment, the resource indicator value is used to indicate a start RBG and a quantity of consecutive RBGs starting from the start RBG.

Figure 12:
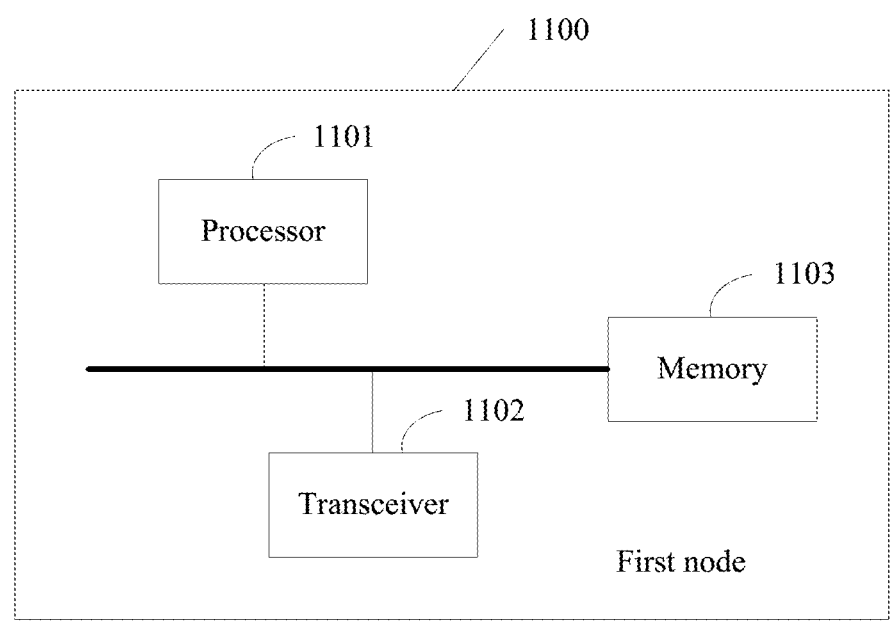
FIG. 12 is a schematic structural diagram of another first node according to an embodiment of the present invention.

The first node in the embodiment shown in FIG. 11 may be implemented as a first node shown in FIG. 12. As shown in FIG. 12, FIG. 12 is a schematic structural diagram of a first node according to an embodiment of the present invention. The first node 1100 shown in FIG. 12 includes a processor 1101 and a transceiver 1102. The processor 1101 is communicatively connected to the transceiver 1102, for example, by using a bus. Optionally, the first node 1100 may further include a memory 1103. It should be noted that in actual application, there is at least one transceiver 1102, and the structure of the first node 1100 does not constitute a limitation on this embodiment of the present invention.

The processor 1101 is applied to this embodiment of the present invention, to implement the function of the determining module 12 shown in FIG. 11. The transceiver 1102 is applied to this embodiment of the present invention, to implement the functions of the receiving module 11 and the transmission module 13 shown in FIG. 11. Optionally, the transceiver 1102 includes a receiver and a transmitter.

The processor 1101 may be a central processing unit (CPU), a general purpose processor, a digital signal processor (DSP), an application-specific integrated circuit (ASIC), a field-programmable gate array (FPGA) or another programmable logic device, a transistor logic device, a hardware component, or any combination thereof. The processor 1101 may implement or execute various examples of logical blocks, modules, and circuits that are described with reference to content disclosed in this application. Alternatively, the processor oi may be a combination of processors implementing a computing function, for example, a combination of one or more microprocessors, or a combination of the DSP and a microprocessor.

The memory 1103 may be a read-only memory (ROM) or an another-type static storage device that can store static information and instructions, or a random access memory (RAM) or an another-type dynamic storage device that can store information and instructions; or may be an electrically erasable programmable read-only memory (EEPROM), a compact disc read-only memory (CD-ROM) or another compact disc storage or optical disc storage (including a compact disc, a laser disc, an optical disc, a digital versatile disc, and a Blu-ray disc, or the like), a disk storage medium or another disk storage device, or any other medium that can be used to carry or store expected program code in a form of an instruction or data structure and that can be accessed by a computer, but is not limited thereto.

Optionally, the memory 1103 is configured to store application program code for executing the solutions of this application, and the processor 1101 controls execution of the solutions of this application. The processor oi is configured to execute the application program code stored in the memory 1103, so as to implement the actions of the first node provided in any one of the embodiments shown in FIG. 4 to FIG. 10.

An embodiment of the present invention further provides a computer storage medium. The computer storage medium is configured to store a computer software instruction used by the first node, and the computer software instruction includes a program designed for the first node to execute the foregoing aspect.

Figure 13:
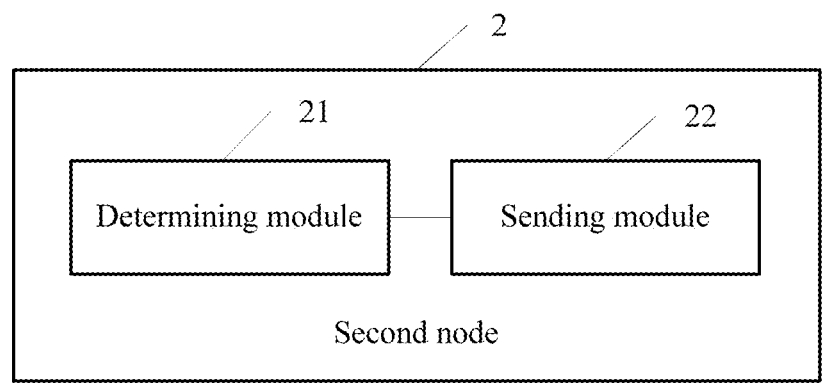
FIG. 13 is a schematic structural diagram of a second node according to an embodiment of the present invention.

FIG. 13 is a schematic structural diagram of a second node according to an embodiment of the present invention. The second node in this embodiment of the present invention may be the second node provided in any one of the embodiments shown in FIG. 4 to FIG. 10. As shown in FIG. 13, a second node 2 in this embodiment of the present invention may include a determining module 21 and a sending module 22.

The determining module 21 is configured to determine downlink control information (DCI), where the DCI includes resource indication information, the resource indication information is used to determine a first resource allocation manner and an allocated transmission resource for a first node, and the first resource allocation manner is used to allocate a transmission resource greater than one narrowband (NB).

The sending module 22 is configured to send the DCI to the first node.

In an optional embodiment, the resource indication information includes a first field, and a value of the first field belongs to a first state set.

Further, optionally, a quantity of binary bits of the first field is 5; and the first state set includes a 5-bit binary value corresponding to a positive integer within an interval range [21, 31].

Further, optionally, a system bandwidth of the second node includes a plurality of resource block groups (RBGs), and each RBG includes at least one RB; and the resource indication information further includes a fourth field, and the first field and the fourth field are used to determine a resource indicator value.

Further, optionally, the first field and the fourth field are used to calculate a first intermediate indicator value according to a first calculation formula; the first intermediate indicator value is used to determine the resource indicator value based on a preset first mapping relationship; and the first calculation formula is:

$X_1 = 11*M_1 + (N_1 - 21)$, where $M_1$ represents a decimal number corresponding to a binary value of the fourth field, $N_1$ represents a decimal number corresponding to a binary value of the first field, and $X_1$ represents the first intermediate indicator value.

Further, optionally, the system bandwidth of the second node includes 96 RBs, a maximum bandwidth supported by the first node is 96 RBs, each RBG includes six RBs, and the first mapping relationship is:

$RIV = X_1 + 16$, where

RIV represents the resource indicator value.

Further, optionally, the system bandwidth of the second node includes 96 RBs, a maximum bandwidth supported by the first node is 24 RBs, each RBG includes three RBs, and the first mapping relationship is:

$$i_1 = \left\lfloor \frac{X_1}{55} \right\rfloor$$

$$j_1 = \left\lfloor \frac{X_1 - 55*i_1}{30 - i} \right\rfloor * (5 - 2*i_1) + i_1$$

$$RIV = X_1 - \left\lfloor \frac{X_1 - 55*i_1}{30 - i} \right\rfloor * (30 - i_1) - 55*i_1 + 32*(2 + j_1), \text{ where}$$

$i_1$ represents a parameter calculated based on the first intermediate indicator value $X_1$, $j_1$ represents a parameter calculated based on the first intermediate indicator value $X_1$, and RIV represents the resource indicator value; or $RIV = X_1 + \text{Offset}(X_1)$, where RIV represents the resource indicator value, and Offset $(X_1)$ represents a predefined offset of the resource indicator value RIV relative to the first intermediate indicator value $X_1$.

In an optional embodiment, the resource indication information includes a second field including Z binary bits, Z is a positive integer, and each bit in the Z bits of the second field is 1.

Further, optionally, a quantity of binary bits of the second field is 2.

Further, optionally, a system bandwidth of the second node includes a plurality of resource block groups (RBGs), and each RBG includes at least one RB; and the resource indication information further includes a sixth field, and the sixth field is used to determine a resource indicator value.

Further, optionally, the sixth field includes a third sub-field and a fourth sub-field; the third sub-field and the fourth sub-field are used to calculate a third intermediate indicator value according to a third calculation formula; the third intermediate indicator value is used to determine the resource indicator value based on a preset third mapping relationship; and the third calculation formula is:

$X_3 = 8*M_3 + N_3$, where $M_3$ represents a decimal number corresponding to a binary value of the third sub-field, $N_3$ represents a decimal number corresponding to a binary value of the fourth sub-field, and $X_3$ represents the third intermediate indicator value.

Further, optionally, the system bandwidth of the second node includes 96 RBs, a maximum bandwidth supported by the first node is 96 RBs, each RBG includes six RBs, and the third mapping relationship is:

$RIV = X_3 + 16$, where

RIV represents the resource indicator value.

Further, optionally, the system bandwidth of the second node includes 96 RBs, a maximum bandwidth supported by the first node is 24 RBs, each RBG includes three RBs, and the third mapping relationship is:

$$i_3 = \left\lfloor \frac{X_3}{28} \right\rfloor$$

$$j_3 = \left\lfloor \frac{X_3 - 28*i_3}{15 - \left\lfloor \frac{i}{2} \right\rfloor} \right\rfloor * (5 - 2*i_3) + i_3$$

$$RIV = 2*\left(X_3 - \left\lfloor \frac{X_3 - 28*i_3}{15 - \left\lfloor \frac{i_3}{2} \right\rfloor} \right\rfloor * \left(15 - \left\lfloor \frac{1}{2} \right\rfloor\right) - 28*i_3\right) + 32*(2 + j_3), \text{ where}$$

$i_3$ represents a parameter calculated based on the third intermediate indicator value $X_3$, $j_3$ represents a parameter calculated based on the third intermediate indicator value $X_3$, and RIV represents the resource indicator value; or $RIV = X_3 + \text{Offset}(X_3)$, where RIV represents the resource indicator value, and Offset $(X_3)$ represents a predefined offset of the resource indicator value RIV relative to the third intermediate indicator value $X_3$.

In an optional embodiment, the resource indication information includes a third field, and the third field is a first preset value.

Further, optionally, a quantity of binary bits of the third field is 1.

Further, optionally, a system bandwidth of the second node includes a plurality of resource block groups (RBGs), and each RBG includes at least one RB; and the resource indication information further includes a fifth field, and the fifth field is used to determine a resource indicator value.

Further, optionally, the fifth field includes a first sub-field and a second sub-field; the first sub-field and the second sub-field are used to calculate a second intermediate indicator value according to a second calculation formula; the second intermediate indicator value is used to determine the resource indicator value based on a preset second mapping relationship; and the second calculation formula is:

$X_2 = 32 * M_2 + N_2$, where $M_2$ represents a decimal number corresponding to a binary value of the first sub-field, $N_2$ represents a decimal number corresponding to a binary value of the second sub-field, and $X_2$ represents the second intermediate indicator value.

Further, optionally, the system bandwidth of the second node includes 96 RBs, a maximum bandwidth supported by the first node is 96 RBs, each RBG includes three RBs, and the second mapping relationship is:

$RIV = X_2 + 63$, where

RIV represents the resource indicator value.

Further, optionally, the system bandwidth of the second node includes 96 RBs, a maximum bandwidth supported by the first node is 24 RBs, each RBG includes two RBs, and the second mapping relationship is:

$$i_2 = \left\lfloor \frac{X_2}{82} \right\rfloor$$
$$j_2 = \left\lfloor \frac{X_2 - 82 * i_2}{45 - i} \right\rfloor * (8 - 2 * i_2) + i_2$$
$$RIV = X_2 - \left\lfloor \frac{X_2 - 82 * i_2}{45 - i_2} \right\rfloor * (45 - i_2) - 82 * i_2 + 48 * (3 + j_2), \text{ where}$$

$i_2$ represents a parameter calculated based on the second intermediate indicator value $X_2$, $j_2$ represents a parameter calculated based on the second intermediate indicator value $X_2$, and RIV represents the resource indicator value; or $RIV = X_2 + \text{Offset}(X_2)$, where RIV represents the resource indicator value, and Offset($X_2$) represents a predefined offset of the resource indicator value RIV relative to the second intermediate indicator value $X_2$.

In an optional embodiment, the resource indicator value is used to indicate a start RBG and a quantity of consecutive RBGs starting from the start RBG.

Figure 14:
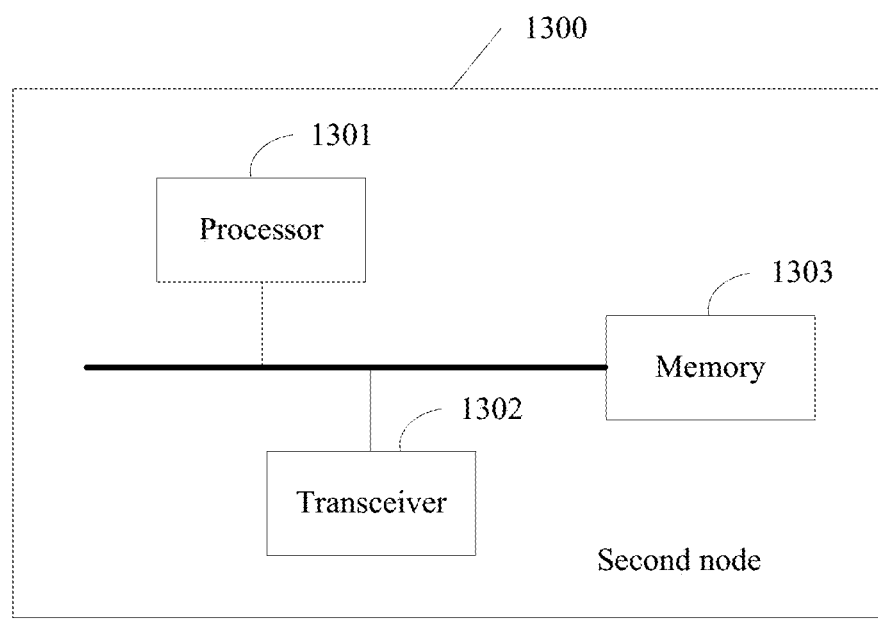
FIG. 14 is a schematic structural diagram of another second node according to an embodiment of the present invention.

The second node in the embodiment shown in FIG. 13 may be implemented as a second node shown in FIG. 14. As shown in FIG. 14, FIG. 14 is a schematic structural diagram of a second node according to an embodiment of the present invention. The second node 1300 shown in FIG. 14 includes a processor 1301 and a transceiver 1302. The processor 1301 is communicatively connected to the transceiver 1302, for example, by using a bus. Optionally, the second node 1300 may further include a memory 1303. It should be noted that in actual application, there is at least one transceiver 1302, and the structure of the second node 1300 does not constitute a limitation on this embodiment of the present invention.

The processor 1301 is applied to this embodiment of the present invention, to implement the function of the determining module 21 shown in FIG. 13. The transceiver 1302 is applied to this embodiment of the present invention, to implement the function of the sending module 22 shown in FIG. 13. Optionally, the transceiver 1302 includes a receiver and a transmitter.

The processor 1301 may be a CPU, a general purpose processor, a DSP, an ASIC, an FPGA or another programmable logic device, a transistor logic device, a hardware component, or any combination thereof. The processor 1301 may implement or execute various examples of logical blocks, modules, and circuits that are described with reference to content disclosed in this application. Alternatively, the processor 1301 may be a combination of processors implementing a computing function, for example, a combination of one or more microprocessors, or a combination of the DSP and a microprocessor.

The memory 1303 may be a ROM or an another-type static storage device that can store static information and instructions, or a RAM or an another-type dynamic storage device that can store information and instructions; or may be an EEPROM, a CD-ROM or another compact disc storage or optical disc storage (including a compact disc, a laser disc, an optical disc, a digital versatile disc, a Blu-ray disc, or the like), a disk storage medium or another disk storage device, or any other medium that can be used to carry or store expected program code in a form of an instruction or data structure and that can be accessed by a computer, but is not limited thereto.

Optionally, the memory 1303 is configured to store application program code for executing the solutions of this application, and the processor 1301 controls execution of the solutions of this application. The processor 1301 is configured to execute the application program code stored in the memory 1303, so as to implement the actions of the second node provided in any one of the embodiments shown in FIG. 4 to FIG. 10.

An embodiment of the present invention further provides a computer storage medium. The computer storage medium is configured to store a computer software instruction used by the second node, and the computer software instruction includes a program designed for the second node to execute the foregoing aspect.

Although this application is described with reference to specific features and the embodiments thereof, obviously, various modifications and combinations may be made to them without departing from the spirit and scope of this application. Correspondingly, the specification and accompanying drawings are merely examples of this application defined by the claims, and are considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

The invention claimed is:

1. A method, comprising:
   determining, by a second node, downlink control information, wherein the downlink control information comprises resource indication information, the resource indication information indicates a resource allocation manner and an allocated transmission resource, and the resource allocation manner is usable to allocate a transmission resource greater than a narrowband; and sending, by the second node, the downlink control information to a first node.

2. The method according to claim 1, wherein the resource indication information comprises a first field, and a value of the first field belongs to a first state set.

3. The method according to claim 2, wherein:
a quantity of binary bits of the first field is 5; and
the first state set comprises a 5-bit binary value corresponding to a positive integer within an interval range of [21, 31].

4. The method according to claim 2, wherein:
the resource indication information comprises the first field and a second field, and the first field and the second field are usable to determine a resource indicator value corresponding to the allocated transmission resource.

5. The method according to claim 4, wherein the second field includes $$\left\lceil \log_2 \left\lfloor \frac{N_{RB}^{UL}}{6} \right\rfloor \right\rceil$$

bits, wherein $N_{RB}^{UL}$ indicates a quantity of resource blocks included in an uplink system bandwidth.

6. The method according to claim 4, wherein:
a system bandwidth of the second node comprises a plurality of resource block groups, and each resource block group of the plurality of resource block groups comprises at least one resource block; and
the resource indicator value indicates a start resource block group of the plurality of resource block groups and a quantity of consecutive resource block groups starting from the start resource block group.

7. The method according to claim 4, wherein each resource block group of the allocated transmission resource comprises three consecutive resource blocks.

8. The method according to claim 7, wherein a maximum bandwidth supportable by the first node is 5 MHz.

9. The method according to claim 7, wherein:
a system bandwidth is 5 MHz, 10 MHz, 15 MHz or 20 MHz, and the resource allocation manner is usable to allocate 3 resource block groups, 4 resource block groups, 5 resource block groups, 6 resource block groups, 7 resource block groups or 8 resource block groups; or
a system bandwidth is 3 MHz, and the resource allocation manner is usable to allocate 3 resource block groups or 4 resource block groups.

10. The method according to claim 1, wherein a format of the downlink control information is format 6-0A.

11. The method according to claim 1, wherein the narrowband consists of 6 resource blocks.

12. An apparatus, comprising:
a processor coupled to a non-transitory memory, and configured to read instructions stored in the memory, wherein the instructions comprise instructions for causing the apparatus to:
determine downlink control information, wherein the downlink control information comprises resource indication information, the resource indication information indicates a resource allocation manner and an allocated transmission resource, and the resource allocation manner is usable to allocate a transmission resource greater than a narrowband; and
send the downlink control information to a first node.

13. The apparatus according to claim 12, wherein the resource indication information comprises a first field, and a value of the first field belongs to a first state set.

14. The apparatus according to claim 13, wherein:
a quantity of binary bits of the first field is 5; and
the first state set comprises a 5-bit binary value corresponding to a positive integer within an interval range of [21, 31].

15. The apparatus according to claim 13, wherein the resource indication information further comprises a second field, and the first field and the second field are usable to determine a resource indicator value corresponding to the allocated transmission resource.

16. The apparatus according to claim 15, wherein the second field includes $$\left\lceil \log_2 \left\lfloor \frac{N_{RB}^{UL}}{6} \right\rfloor \right\rceil$$

bits, wherein $N_{RB}^{UL}$ indicates a quantity of resource blocks included in an uplink system bandwidth.

17. The apparatus according to claim 15, wherein:
a system bandwidth of the apparatus comprises a plurality of resource block groups, and each resource block group of the plurality of resource block groups comprises at least one resource block; and
the resource indicator value indicates a start resource block group of the plurality of resource block groups and a quantity of consecutive resource block groups starting from the start resource block group.

18. The apparatus according to claim 15, wherein each resource block group of the allocated transmission resource comprises three consecutive resource blocks.

19. The apparatus according to claim 18, wherein:
a system bandwidth is 5 MHz, 10 MHz, 15 MHz or 20 MHz, and the resource allocation manner is usable to allocate 3 resource block groups, 4 resource block groups, 5 resource block groups, 6 resource block groups, 7 resource block groups or 8 resource block groups; or
a system bandwidth is 3 MHz, and the resource allocation manner is usable to allocate 3 resource block groups or 4 resource block groups.

20. The apparatus according to claim 12, wherein a format of the downlink control information is format 6-0A.

21. The apparatus according to claim 12, wherein the narrowband consists of 6 resource blocks.

22. A non-transitory computer-readable storage medium comprising instructions which, when executed by a computer hardware of an apparatus, cause the apparatus to:
determine downlink control information, wherein the downlink control information comprises resource indication information, the resource indication information indicates a resource allocation manner and an allocated transmission resource, and the resource allocation manner is usable to allocate a transmission resource greater than one narrowband; and
send the downlink control information to a first node.

* * * * *